US010009116B2

(12) United States Patent
Baba et al.

(10) Patent No.: US 10,009,116 B2
(45) Date of Patent: Jun. 26, 2018

(54) COMMUNICATION SYSTEM, ELECTRONIC TIMEPIECE, AND COMMUNICATION DEVICE

(71) Applicant: Seiko Epson Corporation, Tokyo (JP)

(72) Inventors: Norimitsu Baba, Shiojiri (JP); Hirokazu Nishijima, Shiojiri (JP)

(73) Assignee: Seiko Epson Corporation (JP)

( * ) Notice: Subject to any disclaimer, the term of this patent is extended or adjusted under 35 U.S.C. 154(b) by 7 days.

(21) Appl. No.: 15/094,366

(22) Filed: Apr. 8, 2016

(65) Prior Publication Data
US 2016/0299475 A1 Oct. 13, 2016

(30) Foreign Application Priority Data

Apr. 10, 2015 (JP) ................................ 2015-081096

(51) Int. Cl.
G04R 20/26 (2013.01)
G04R 20/28 (2013.01)
(Continued)

(52) U.S. Cl.
CPC .............. *H04B 10/80* (2013.01); *G04R 20/26* (2013.01); *G04R 20/28* (2013.01); *G04R 20/30* (2013.01); *H04B 5/0081* (2013.01)

(58) Field of Classification Search
CPC ........ G04R 20/26; G04R 20/28; G04R 20/30; H04B 10/80; H04B 5/0081
See application file for complete search history.

(56) References Cited

U.S. PATENT DOCUMENTS 4,800,543 A 1/1989 Lyndon-James et al.
5,978,656 A 11/1999 Farine et al.
(Continued)

FOREIGN PATENT DOCUMENTS

CH 639236 A 11/1983
JP 2000-321378 A 11/2000
(Continued)

OTHER PUBLICATIONS

Extended European Search Report for EP Application No. 16164423.2, dated Jul. 29, 2016 (12 pages).

Primary Examiner — Amy Cohen Johnson
Assistant Examiner — Daniel Wicklund
(74) Attorney, Agent, or Firm — Harness, Dickey & Pierce, P.L.C.

(57) ABSTRACT

Either the electronic timepiece or the communication device of a communication system has a first communicator, and the other has a second communicator. The first communicator has a first transmitter including a transmission coil and a drive circuit configured to drive the transmission coil, and is configured to transmit signals by communicating through electromagnetic coupling; and an first receiver including a photodetector and a detection circuit that detects the output value of the photodetector, and configured to receive signals by optical communication. The second communicator has an second transmitter including a light-emitting device and a drive circuit that drives the light-emitting device, and configured to transmit signals by optical communication; and a second receiver including a reception coil and a detection circuit that detects the output value of the reception coil, and configured to receive signals by communicating through electromagnetic coupling.

17 Claims, 32 Drawing Sheets

(51) Int. Cl.
    *G04R 20/30*     (2013.01)
    *H04B 10/80*     (2013.01)
    *H04B 5/00*     (2006.01)

(56) References Cited

U.S. PATENT DOCUMENTS

| | | | |
|---|---|---|---|
| 6,751,164 B1 | 6/2004 | Sekiguchi | |
| 2003/0112708 A1* | 6/2003 | Fujisawa | G04C 3/14 368/47 |
| 2003/0146736 A1* | 8/2003 | Kosuda | H02J 7/0093 320/132 |
| 2005/0105401 A1* | 5/2005 | Akahane | G04R 20/00 368/187 |
| 2007/0206442 A1 | 9/2007 | Kim | |
| 2016/0246264 A1* | 8/2016 | Nagareda | G04R 20/26 |
| 2016/0266554 A1* | 9/2016 | Ogasawara | G04R 20/26 |
| 2016/0274550 A1* | 9/2016 | Ogasawara | G04C 10/02 |
| 2017/0075310 A1* | 3/2017 | Maesawa | G04G 19/00 |
| 2017/0118639 A1* | 4/2017 | Beale | H04W 12/06 |

FOREIGN PATENT DOCUMENTS

| | | |
|---|---|---|
| JP | 2001-099964 A | 4/2001 |
| JP | 2005-241403 A | 9/2005 |
| JP | 2006-105826 A | 4/2006 |
| JP | 2006-349499 A | 12/2006 |
| JP | 2014-048136 A | 3/2014 |
| JP | 2014-053657 A | 3/2014 |
| WO | WO-2001-006329 A1 | 1/2001 |

* cited by examiner

LOCAL TIME INFORMATION

| REGION INFOR-MATION | TIME ZONE INFORMA-TION | TIME ZONE CHANGE INFORMATION | DST OFFSET INFORMA-TION | DST START INFORMA-TION | DST END INFORMA-TION | DST CHANGE INFORMATION |
|---|---|---|---|---|---|---|
| REGION 1 | UTC+9 | – | 0 | – | – | – |
| REGION 2 | UTC+8 | 2014.10.26 2:00 UTC+9 | 0 | – | – | – |
| REGION 3 | UTC+7 | – | +1 | 1:00 LAST SUNDAY IN MARCH | 2:00 LAST SUNDAY IN OCTOBER | NO DST STARTING 2015 |
| ... | ... | ... | ... | ... | ... | ... |

FIG. 11

CHANGE HISTORY

| DATE | REGION | CHANGE |
|---|---|---|
| 2013.2.15 | Chile | DST CHANGE |
| 2013.3.7 | Paraguay | DST CHANGE |
| 2013.3.11 | Cuba | DST CHANGE |
| 2013.3.28 | Israel | DST CHANGE |
| 2013.4.15 | Palestine | DST CHANGE |
| 2013.7.2 | Morocco & Western Sahara | DST CHANGE |
| 2013.7.8 | Israel | DST CHANGE |
| 2013.8.16 | Chile Easter Island | DST CHANGE |
| 2013.9.4 | Fiji | DST CHANGE |
| 2013.9.24 | Palestine | DST CHANGE |
| 2013.9.30 | Morocco & Western Sahara | DST CHANGE |
| 2013.10.2 | Brazil | DST CHANGE |
| 2013.10.25 | Libya | TIME ZONE CHANGE |
| 2013.11.4 | Brazil | TIME ZONE CHANGE |
| 2013.12.11 | Jordan | TIME ZONE CHANGE |

FIG. 12

FIG. 20A ELECTRONIC TIMEPIECE COIL OUTPUT WAVEFORM M1
FIG. 20B COMMUNICATION DEVICE RECEPTION COIL WAVEFORM
FIG. 20C COMMUNICATION DEVICE LED DRIVE WAVEFORM
1 (ON)　　0 (OFF)　　1 (ON)
FIG. 20D VOLTAGE DETECTION TIMING
FIG. 20E SOLAR CELL OUTPUT WAVEFORM PVIN
THRESHOLD (10,000 Lx)
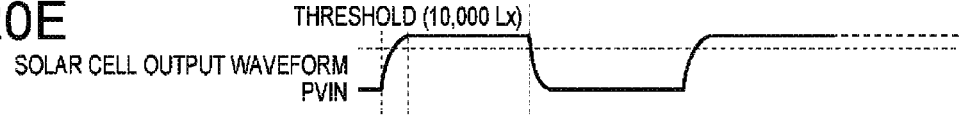
FIG. 20F VOLTAGE DETECTION RESULT
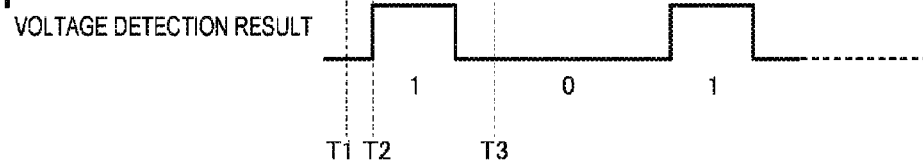
1　　0　　1
T1 T2　　T3

COMMUNICATION SYSTEM, ELECTRONIC TIMEPIECE, AND COMMUNICATION DEVICE

BACKGROUND

1. Technical Field

The present invention relates to a communication system, an electronic timepiece, and a communication device.

2. Related Art

Electronic timepieces configured to communicate wirelessly with an external device in order to update internally stored control data are known from the literature. See, for example, JP-A-2000-321378.

The analog electronic timepiece described in JP-A-2000-321378 has a motor coil, and sends a calibration signal through the motor coil to an external calibration device. When the calibration signal is received through the coil, the external calibration device sends correction data for rate adjustment of the analog electronic timepiece through the coil to the analog electronic timepiece. The analog electronic timepiece then receives the correction data through the motor coil.

The analog electronic timepiece described in JP-A-2000-321378 enables signal communication with an external calibration device, but because there is only a single communication path formed by an electromagnetic coupling through the coil, the communication path must be switched between sending and receiving. As a result, the required communication time is therefore increased by the need to repeatedly switch the communication path between sending and receiving.

SUMMARY

A communication system, an electronic timepiece, and a communication device according to the invention enable sending and receiving signals between an electronic timepiece and an external device, and enable executing the communication process at high speed.

A communication system according to one aspect includes an electronic timepiece and a communication device. Either the electronic timepiece or the communication device has a first communicator; and the other of the electronic timepiece and communication device has a second communicator capable of communicating with the first communicator. The first communication or has a first transmitter including a transmission coil and a drive circuit configured to drive the transmission coil, and is configured to transmit signals by communicating through electromagnetic coupling using the transmission coil; and an first receiver including a photodetector and a detection circuit that detects the output value of the photodetector, and configured to receive signals by optical communication using the photodetector. The second communicator has an second transmitter including a light-emitting device and a drive circuit that drives the light-emitting device, and configured to transmit signals by optical communication using the light-emitting device; and a second receiver including a reception coil and a detection circuit that detects the output value of the reception coil, and configured to receive signals by communicating through electromagnetic coupling using the reception coil.

If the electronic timepiece has the first communicator and the communication device has the second communicator, signals transmitted by the first transmitter of the electronic timepiece are received by the second receiver of the communication device. Signals transmitted by the second transmitter of the communication device are also received by the first receiver of the electronic timepiece.

If the electronic timepiece has the second communicator and the communication device has the first communicator, signals transmitted by the second transmitter of the electronic timepiece are received by the first receiver of the communication device. Signals transmitted by the first transmitter of the communication device are received by the second receiver of the electronic timepiece.

Because the communication path for sending signals from the electronic timepiece to the communication device, and the communication path for sending signals from the communication device to the electronic timepiece, are two separate paths using mutually different communication methods, there is no interference between signals sent from the electronic timepiece to the communication device and signals sent from the communication device to the electronic timepiece. Furthermore, because there is no need to execute a process to switch the signal transmission direction as there is when using only a single communication path, the communication process between the electronic timepiece and communication device can be executed more quickly.

An electronic timepiece according to another aspect has: a first transmitter including a transmission coil and a drive circuit configured to drive the transmission coil, and is configured to transmit signals by communicating through electromagnetic coupling using the transmission coil; and an first receiver including a photodetector and a detection circuit that detects the output value of the photodetector, and configured to receive signals by optical communication using the photodetector.

Because the communication path for transmitting signals and the communication path for receiving signals are two separate paths using different communication methods, there is no interference between signals being sent and signals being received in a small timepiece such as a wristwatch even when the first transmitter and the first receiver are close together. The communication process with the communication device can also execute more quickly because there is no need to execute a process to switch the communication path between sending and receiving as there is when using only a single communication path.

Furthermore, because the first transmitter is configured using a transmission coil, a motor coil disposed in the electronic timepiece can be used as the transmission coil, for example. In this case, there is no need to provide a separate coil for transmission, and an increase in the parts count can be suppressed.

Preferably, the electronic timepiece also has a solar cell configured to receive light and generate power; and the photodetector is embodied by the solar cell.

In this aspect there is no need to provide a separate photodetector, and an increase in the parts count can be suppressed.

An electronic timepiece according to another aspect also has a motor configured to drive a driven member; and the transmission coil is embodied by the motor coil of the motor.

In this aspect of the invention there is no need to provide a separate transmission coil, and an increase in the parts count can be suppressed.

An electronic timepiece according to another aspect also has an alarm buzzer; and the transmission coil is embodied by a buzzer coil disposed to the buzzer.

In this aspect of the invention there is no need to provide a separate transmission coil, and an increase in the parts count can be suppressed.

An electronic timepiece according to another aspect also has a timepiece-side communication processor that controls the first transmitter and the first receiver and executes a communication process, and the timepiece-side communication processor limits output of pulses other than pulses for transmitting signals to the transmission coil while executing the communication process.

For example, if the electronic timepiece has hands for indicating the time, and the transmission coil is embodied by the motor coil of a motor that drives the hands, the timepiece-side communication processor limits outputting movement pulses for indicating the time to the transmission coil while the communication process is executing.

Because signals that are not related to the communication process are prevented from being transmitted from the electronic timepiece during the communication process, this aspect can execute the communication process more reliably.

An electronic timepiece according to another aspect also has an second transmitter including a light-emitting device and a drive circuit that drives the light-emitting device, and configured to transmit signals by optical communication using the light-emitting device; and a second receiver including a reception coil and a detection circuit that detects the output value of the reception coil, and configured to receive signals by communicating through electromagnetic coupling using the reception coil.

Because the communication path for transmitting signals and the communication path for receiving signals are two separate paths using different communication methods in this aspect of the invention, there is no interference between signals being sent and signals being received in a small timepiece such as a wristwatch even when the second transmitter and the second receiver are close together. The communication process with the communication device can also execute more quickly because there is no need to execute a process to switch the communication path between sending and receiving as there is when using only a single communication path.

Furthermore, because the second receiver is configured using a reception coil, a motor coil disposed in the electronic timepiece can be used as the reception coil, for example. In this case, there is no need to provide a separate coil for reception, and an increase in the parts count can be suppressed.

An electronic timepiece according to another aspect also has a timepiece-side transmission controller configured to control the first transmitter or the second transmitter, and execute a transmission process that sends a data request signal to the communication device to acquire a data signal from the communication device; and a timepiece-side reception controller configured to control the first receiver or the second receiver, and execute a reception process to receive the data signal transmitted from the communication device.

In this aspect, the timepiece-side transmission controller sends a data request signal to the communication device. When the data request signal is received, the communication device sends a data signal to the electronic timepiece. The timepiece-side reception controller then receives the data signal.

As a result, the data signal transmission and reception timing can be reliably synchronized between the communication device and the electronic timepiece. The electronic timepiece can therefore reliably receive data signals sent from the communication device. Furthermore, because the communication path for sending data request signals and the communication path for receiving data signals are two separate paths using mutually different communication methods, there is no need to execute a process to switch the communication path between sending and receiving as there is when using only a single communication path, and the communication speed can be improved.

An electronic timepiece according to another aspect preferably also has nonvolatile memory that stores signals; and stores signals received by the first receiver or the second receiver in the nonvolatile memory.

Because signals stored in nonvolatile memory are not erased even when the electronic timepiece is reset, and there is no need to resend the same signals from the communication device to the electronic timepiece.

In an electronic timepiece according to another aspect, a signal of a parameter for controlling operation of the electronic timepiece is included in the signals received by the first receiver or the second receiver.

Examples of such parameters include rate information and stepper motor drive settings. Because the electronic timepiece is updated by the received parameters in this aspect of the invention, control of the electronic timepiece movement, for example, can be optimized.

In an electronic timepiece according to another aspect, a signal of a program for controlling operation of the electronic timepiece is included in the signals received by the first receiver or the second receiver.

Functions of the electronic timepiece can be adjusted or added in this aspect of the invention because the electronic timepiece is updated by the received program.

In an electronic timepiece according to another aspect, a signal of time zone information or information related to daylight saving time is included in the signals received by the first receiver or the second receiver.

This aspect enables displaying the time based on the most recent time zone information or daylight saving time information because the electronic timepiece can be updated by the received time zone information or daylight saving time information.

Another aspect is a communication device including: an second transmitter including a light-emitting device and a drive circuit that drives the light-emitting device, and configured to transmit signals by optical communication using the light-emitting device; and a second receiver including a reception coil and a detection circuit that detects the output value of the reception coil, and configured to receive signals by communicating through electromagnetic coupling using the reception coil.

Because the communication path for transmitting signals and the communication path for receiving signals are two separate paths using different communication methods in this aspect of the invention, there is no interference between signals being sent and signals being received. The communication process with the communication device can also execute more quickly because there is no need to execute a process to switch the communication path between sending and receiving as there is when using only a single communication path.

A communication device according to another aspect preferably also has a stand on which an electronic timepiece is placed. The reception coil is disposed on the back cover side of the electronic timepiece placed on the stand; and the light-emitting device is disposed on the crystal side of the electronic timepiece placed on the stand.

The electronic timepiece placed on the communication device in this aspect has a first transmitter including a transmission coil, and a first receiver including a photodetector. The electronic timepiece is placed on the stand with the back cover facing the stand, for example.

Because the light-emitting device is disposed on the crystal side of the electronic timepiece in this aspect of the invention, light emitted from the light-emitting device passes through the crystal and is received by the photodetector of the electronic timepiece.

The motor coil or other transmission coil is disposed in the electronic timepiece closer to the back cover than the crystal. By disposing the reception coil on the back cover side of the electronic timepiece, the reception coil is closer to the transmission coil than when disposed closer to the crystal, and signals can be more reliably sent from the electronic timepiece to the communication device.

A communication device according to another aspect preferably also has a stand on which an electronic timepiece is placed; and the reception coil and the light-emitting device are disposed on the crystal side of the electronic timepiece placed on the stand.

In this aspect the electronic timepiece is placed on the stand with the crystal facing the stand, for example.

Because the light-emitting device is disposed to the crystal side of the electronic timepiece in this aspect of the invention, light emitted from the light-emitting device passes through the crystal and is received by the photodetector of the electronic timepiece.

The reception coil in this aspect is disposed to the crystal side of the electronic timepiece, that is, the same side as the light-emitting device. As a result, the reception coil and the light-emitting device can be disposed to the stand, and the communication device can be configured more compactly than a configuration in which the reception coil is disposed to the stand and the light-emitting device is disposed to an arm extending from the stand, for example.

Another aspect is a communication device including: a first transmitter including a transmission coil and a drive circuit configured to drive the transmission coil, and is configured to transmit signals by communicating through electromagnetic coupling using the transmission coil; and an first receiver including a photodetector and a detection circuit that detects the output value of the photodetector, and configured to receive signals by optical communication using the photodetector.

Because the communication path for transmitting signals and the communication path for receiving signals are two separate paths using different communication methods, there is no interference between signals being sent and signals being received. The communication process with the electronic timepiece can also execute more quickly because there is no need to execute a process to switch the communication path between sending and receiving as there is when using only a single communication path.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 11 shows the data configuration of local time information in the first embodiment.

FIG. 12 shows an example of the change history of time difference information.

FIGS. 20A-F are timing charts showing the timing of the signals during data transmission in the first embodiment.

DESCRIPTION OF EMBODIMENTS

Embodiment 1

Configuration of a Communication System

Figure 1:
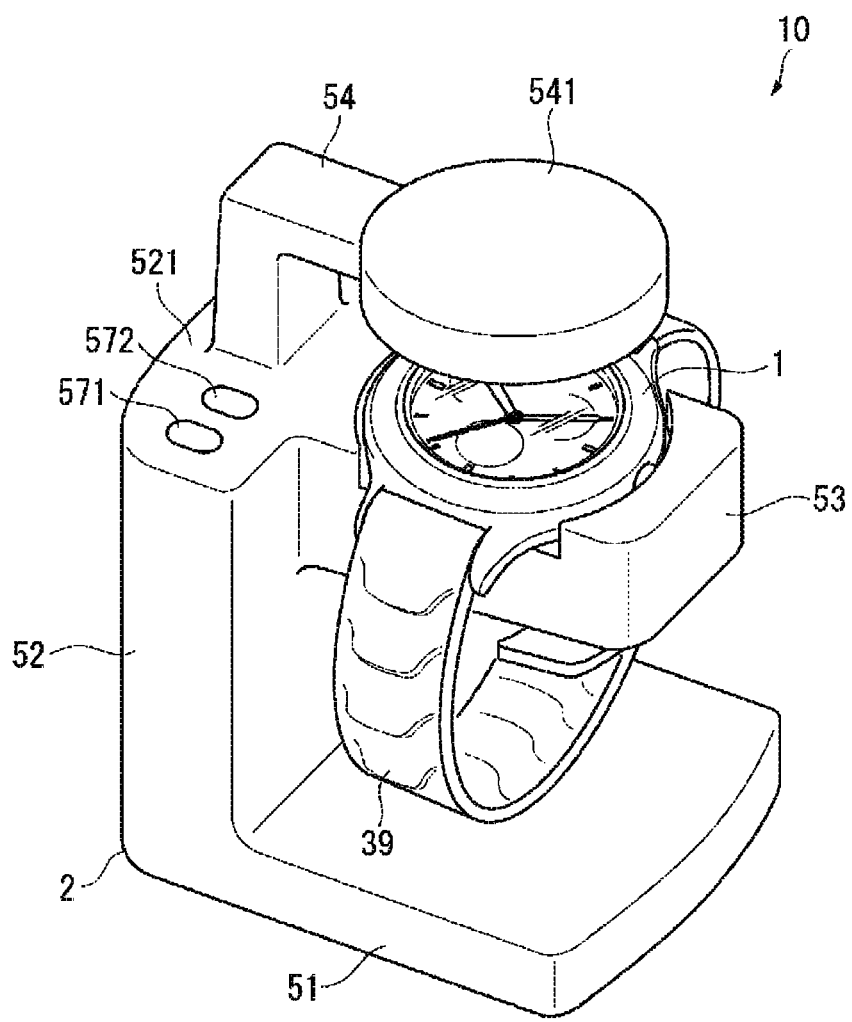
FIG. 1 is an external view of an electronic timepiece and a communication device in a communication system according to the first embodiment.
Figure 2:
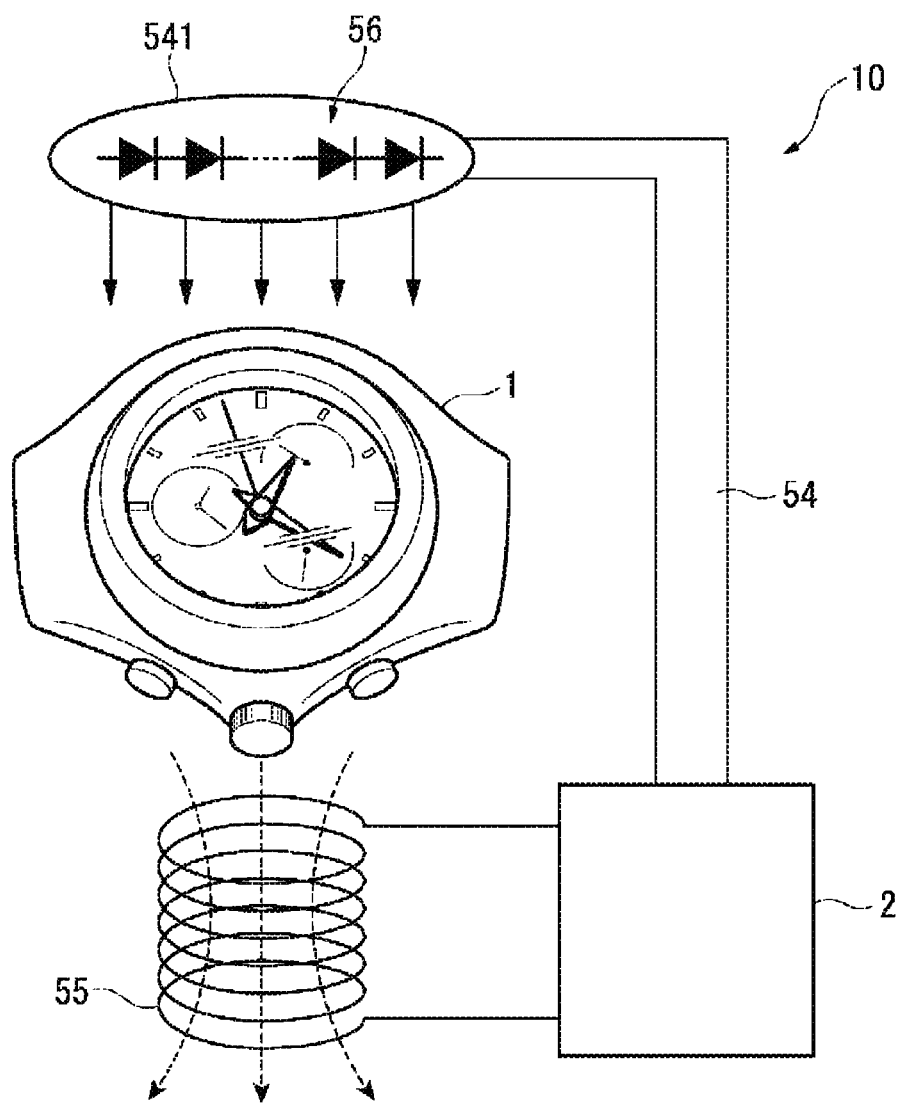
FIG. 2 illustrates the electronic timepiece and communication device in the communication system according to the first embodiment.

FIG. 1 is an external view of an electronic timepiece 1 and a communication device 2 in a communication system 10 according to a preferred embodiment. FIG. 2 illustrates the electronic timepiece 1 and communication device 2 in the communication system 10.

As shown in FIG. 1 and FIG. 2, the communication system 10 includes an electronic timepiece 1, and a communication device 2 that can communicate (send and receive signals) with the electronic timepiece 1.

This electronic timepiece 1 is an analog wristwatch with hands. As described further below, the electronic timepiece 1 has a solar cell 135, which is a photodetector, and a motor coil 143.

The communication device 2 includes a base 51, a main body 52 extending up from the base 51, and a stand 53 extending horizontally from the main body 52. The stand 53 is an example of a stand in the accompanying claims. An arm 54 is disposed to the top 521 of the main body 52, and a lamp 541 is disposed at the distal end of the arm 54.

A coil 55 that is part of the device-side receiver is housed inside the stand 53. A light-emitting device 56 is inside the lamp 541. The light-emitting device 56 in this embodiment is a LED (light-emitting diode).

The electronic timepiece 1 is placed (set) on the stand 53 with the back cover of the electronic timepiece 1 facing the surface of the stand 53. Because the stand 53 is a cantilever projecting from the main body 52, the back cover of the electronic timepiece 1 can be easily placed on the surface of the stand 53 even if the band of the electronic timepiece 1 is a continuous bracelet with a tri-fold buckle. As a result, the motor coil 143 of the electronic timepiece 1 and the coil 55 inside the stand 53 are in close proximity, enabling communication by means of electromagnetic coupling.

The lamp 541 is disposed so that light emitted from the light-emitting device 56 is incident to the surface of the electronic timepiece 1 placed on the stand 53 and is received by the solar cell 135.

A button A 571 for causing the communication device 2 to communicate with the electronic timepiece 1, and a button B 572 for turning the light-emitting device 56 on, are disposed on the top 521 of the main body 52.

When button A 571 is pressed, the communication device 2 starts the communication process with the electronic timepiece.

When button B 572 is pressed, the communication device 2 causes the light-emitting device 56 to light continuously. As a result, light is emitted continuously to the solar cell 135 of the electronic timepiece 1 set on the communication device 2, and the storage battery of the electronic timepiece 1 is charged. When a solar powered electronic timepiece is worn by the user, the solar cell is charged by light from fluorescent lights and other light sources, but when the electronic timepiece is left for a long time unused on a shelf, for example, the electronic timepiece may not be exposed to sufficient light, the battery is therefore not charged, and the capacity (duration) of the battery drops. To use an electronic timepiece with a low capacity battery, the user must expose the electronic timepiece to light and charge the battery. However, if the user is indoors, or it is cloudy or raining, the user may not be able to quickly charge the electronic timepiece. In such cases, the operator of the communication device 2 can quickly and conveniently charge the electronic timepiece by placing the electronic timepiece 1 on the communication device 2 and turning the light-emitting device 56 on to start charging.

The operator of the communication device 2 may be the user of the electronic timepiece, or the provider of a service related to the electronic timepiece, such as a retailer or repair technician.

Note that while not shown in the figures, openings for installing USB (Universal Serial Bus) memory sticks, SD memory cards, CDs (Compact Disc), DVDs (Digital Versatile Disk), or other storage media are also provided in the main body 52 of the communication device 2. A connector for connecting to the Internet or a personal computer through a cable is also disposed to the main body 52.

Operation of the Communication System

Figure 3:
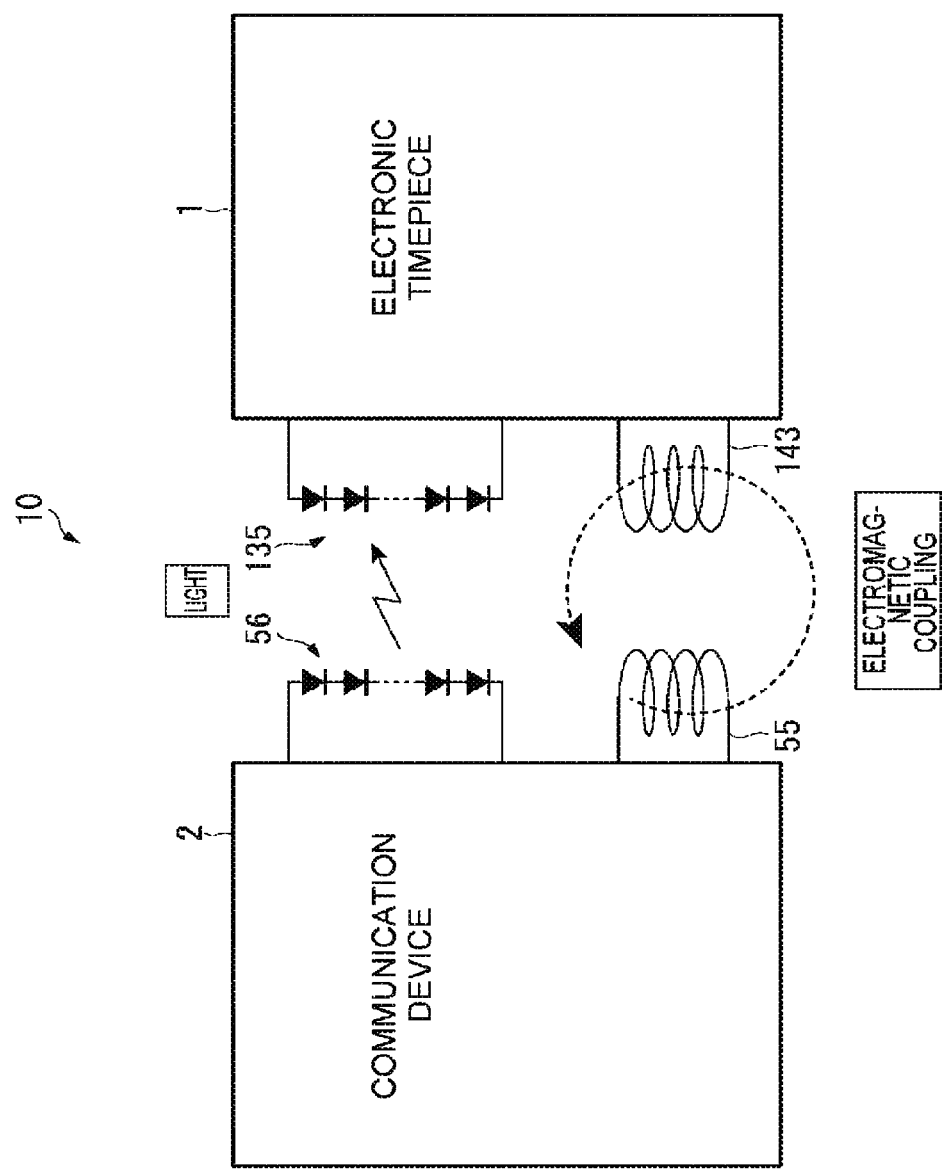
FIG. 3 schematically describes the operation of the communication system according to the first embodiment.

As shown in FIG. 3, when the electronic timepiece 1 outputs a pulse to the motor coil 143 in this communication system 10, a magnetic field is produced in the motor coil 143, an electromagnetic coupling is created between the motor coil 143 and the coil 55 of the communication device 2, and change in the field causes current to flow through the coil 55 and produces an induced voltage. Using this electromagnetic coupling, the electronic timepiece 1 transmits either a 1 signal denoting a 1, or a 0 signal denoting a 0, of a binary code (having the values 1 and 0) depending on whether or not a pulse is output to the motor coil 143. The communication device 2 receives the 1 signal or the 0 signal by detecting whether or not a voltage was produced in the coil 55. The communication device 2 and electronic timepiece 1 thus communicate by electromagnetic coupling.

When the communication device 2 drives and turns the light-emitting device 56 on, light is incident to the solar cell 135 of the electronic timepiece 1. Using this light, the communication device 2 sends a 1 signal or a 0 signal depending upon whether or not the light-emitting device 56 is emitting. Because the generated voltage changes according to whether or not light of a specific intensity is incident to the solar cell 135, the electronic timepiece 1 can receive the 1 signal or 0 signal by detecting the generated voltage. The communication device 2 and electronic timepiece 1 thus communicate by light.

As a result, if light other than the light from the light-emitting device 56 is incident to the electronic timepiece 1, the electronic timepiece 1 cannot receive signals correctly. The communication system 10 is therefore preferably used inside a light-tight dark box.

Electronic Timepiece Configuration

The electronic timepiece 1 is configured so that it can receive satellite signals and acquire time information from at least one GPS satellite in a constellation of multiple GPS satellites orbiting the Earth on known orbits, or receive satellite signals from at least three GPS satellites and calculate the current location (position) from the satellite signals.

General Configuration of the Electronic Timepiece

Figure 4:
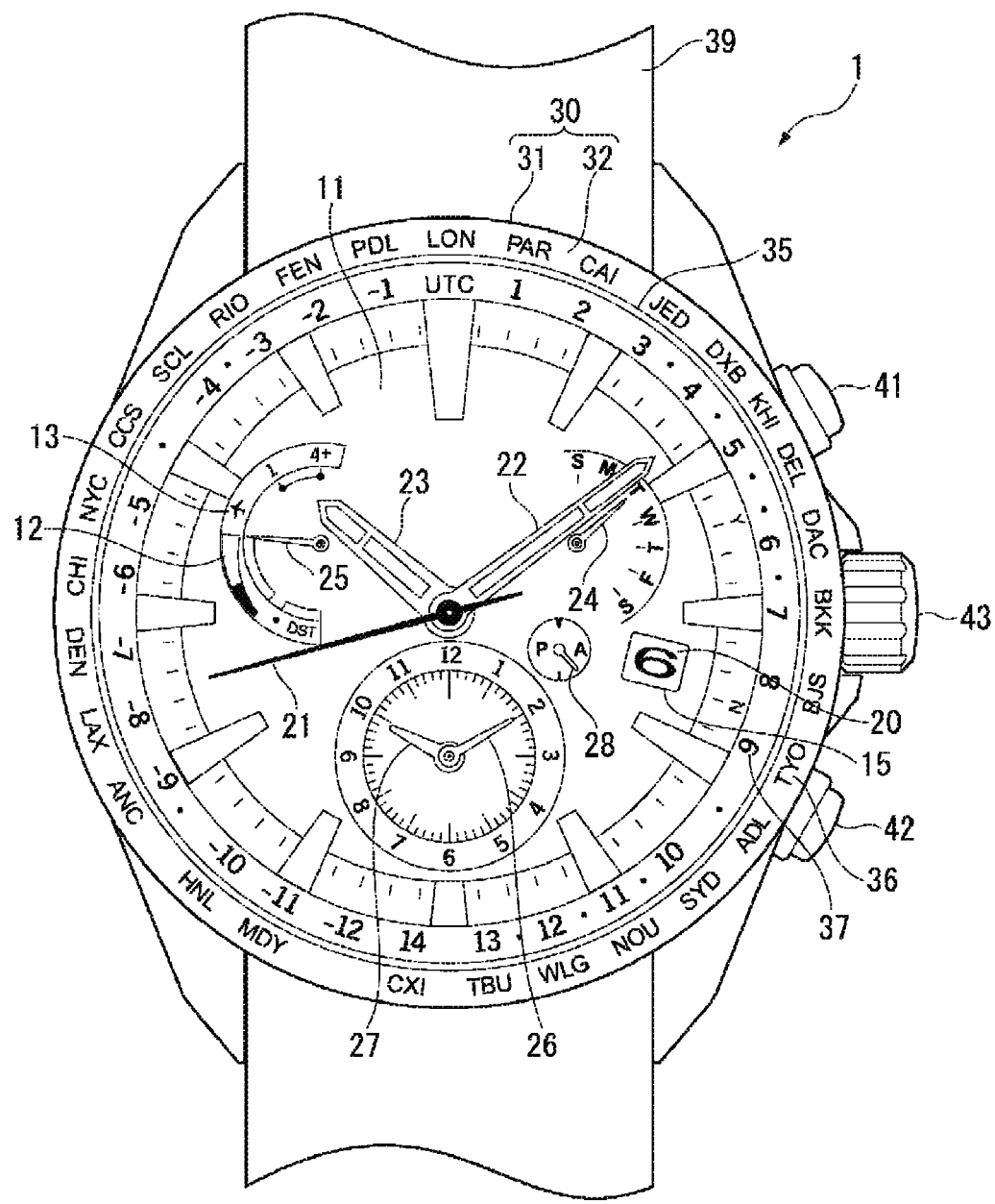
FIG. 4 is a plan view of an electronic timepiece according to the first embodiment.
Figure 5:
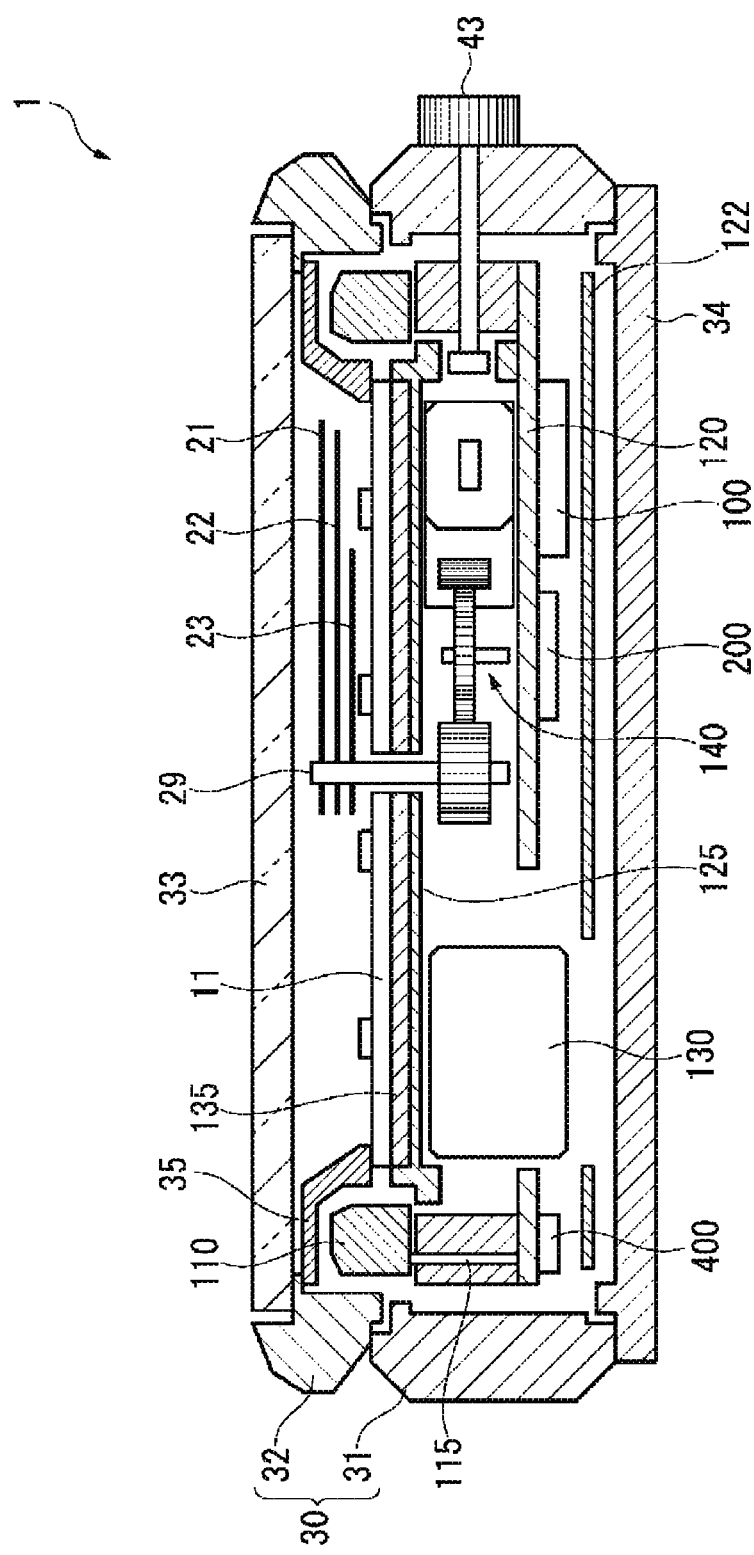
FIG. 5 is a section view of an electronic timepiece according to the first embodiment.

FIG. 4 is a plan view of the electronic timepiece 1, and FIG. 5 is a basic section view of the electronic timepiece 1.

As shown in FIG. 4 and FIG. 5, the electronic timepiece 1 has an external case 30, crystal 33, and back cover 34.

The external case 30 is configured with a ceramic bezel 32 affixed to a cylindrical case member 31 made of metal. A round dial 11 is held on the inside circumference side of the bezel 32 by means of a plastic dial ring 35.

Disposed in the side of the external case 30 are a button A 41, a button B 42, and a crown 43.

As shown in FIG. 5, of the two main openings in the case member 31, the opening on the face side is covered by the crystal 33 held by the bezel 32, and the opening on the back is covered by the metal back cover 34.

Inside the external case 30 are the dial ring 35 attached to the inside circumference of the bezel 32; the light-transparent dial 11; and a drive mechanism 140 that drives each of the hands 21, 22, 23, 24, 25, 26, 27, 28 and the date indicator 20.

The dial ring 35 is ring-shaped when seen in plan view, and is conically shaped when seen in section view. The dial ring 35 and the inside circumference surface of the bezel 32 create a donut-shaped space, and a ring-shaped antenna 110 is housed inside this space.

The dial 11 is a round disk for indicating the time inside the external case 30, is made of plastic or other optically transparent material, and is disposed inside of the dial ring 35 with the hands between the dial 11 and the crystal 33.

A solar cell 135, which is a photovoltaic power generator, is disposed between the dial 11 and a main plate 125 to which the drive mechanism 140 is disposed.

Figure 6:
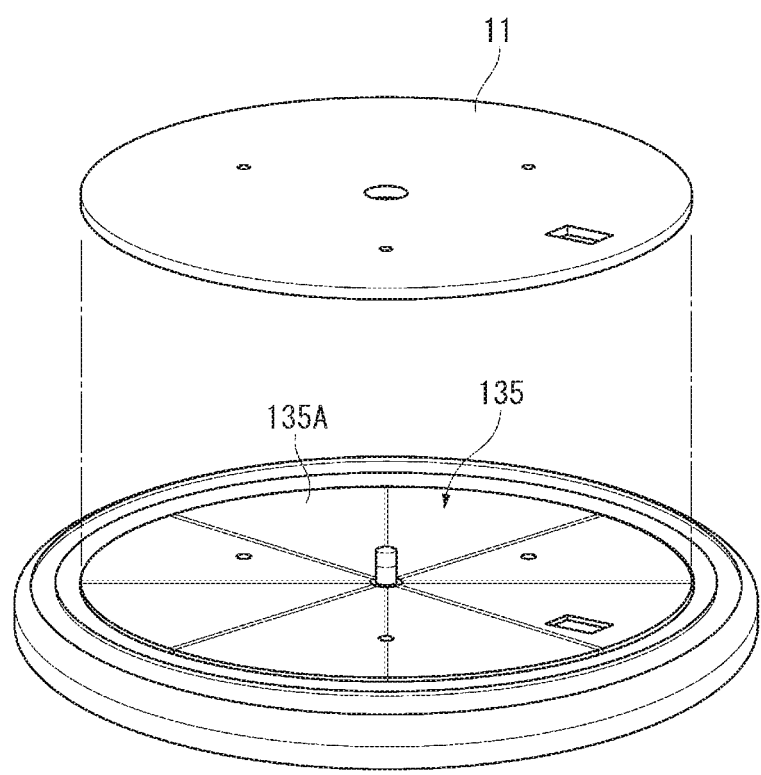
FIG. 6 is an oblique view of the solar cell in the first embodiment.

FIG. 6 is an oblique view of the solar cell 135 from the front of the timepiece. The solar cell 135 in this embodiment is a round flat solar panel having eight solar cells 135A (photovoltaic devices) that convert light energy to electrical energy (power) connected in series. The solar cell 135 is substantially the same size as the dial 11.

Through-holes through which the center arbor 25 of the hands 21, 22, 23 and the pivots (not shown in the figure) of the other hands 24, 25, 26, 27, 28 pass, and an aperture for the date window 15, are formed in the dial 11, solar cell 135, and main plate 125.

The drive mechanism 140 is disposed to the main plate 125, and is covered by a circuit board 120 from the back side. The drive mechanism 140 includes a stepper motor and wheel train, and drives the hands by the stepper motor rotationally driving the pivots through the wheel train.

The drive mechanism 140 more specifically includes first to sixth drive mechanisms. The first drive mechanism drives the minute hand 22 and hour hand 23; the second drive mechanism drives hand 21; the third drive mechanism drives hand 24; the fourth drive mechanism drives hand 25; the fifth drive mechanism drives hands 26, 27, and 28; and the sixth drive mechanism drives the date indicator 20.

The circuit board 120 has a GPS receiver 400, a control device 100, and a storage 200. The circuit board 120 and antenna 110 connect through an antenna connection pin 115. A circuit cover 122 covers the reception device 400, control device 100, and storage 200 from the back cover 34 side of the circuit board 120 to which these parts are disposed. A lithium ion battery or other type of storage battery 130 is disposed between the main plate 125 and the back cover 34. The storage battery 130 is charged with power produced by the solar cell 135.

Display Mechanism of the Electronic Timepiece

The hands 21, 22, 23 are disposed to a center arbor 25 that passes through the dial in the plane center of the dial 11, and is aligned with the center axis between the front and back of the timepiece. Note that the center arbor 25 comprises three pivots (rotational pivots) to which the hands 21, 22, 23 are attached.

As shown in FIG. 4, a scale of 60 minute markers is formed on the inside circumference side of the dial ring 35 around the outside edge of the dial 11. Using these markers, hand 21 indicates the second of the first time (the local time, such as the current local time when travelling abroad), hand 22 indicates the minute of the first time, and hand 23 indicates the hour of the first time. Note that because the second of the first time is the same as the second of the second time described below, the user can also know the second of the second time by reading the second hand 21.

Note that the letter Y is disposed at the 12 minute marker on the dial ring 35, and the letter N is disposed at the 18 minute marker. The second hand 21 points to either Y or N to indicate the result of satellite signal reception.

Hand 24 is disposed to a pivot offset from the center of the dial 11 near 2:00, and indicates the day of the week.

Hand 25 is disposed to a pivot offset from the center of the dial 11 near 10:00.

DST and a black dot are disposed along the outside of the range of hand 25 rotation. DST denotes daylight saving time. The hand 25 points to either DST or the dot depending on whether or not the electronic timepiece 1 is set to the DST mode (DST meaning the daylight saving time mode is on, and the black dot meaning the DST mode is off).

A sickle-shaped symbol 12 is also along the outside of the range of hand 25 rotation. This symbol 12 is used as a reserve power indicator for the storage battery 130 (FIG. 5), and the power reserve is indicated by the hand 25 pointing to the position appropriate to the reserve power in the battery.

An airplane symbol 13 is also along the outside of the range of hand 25 rotation. This symbol is used to indicate the airplane mode. By pointing to the airplane symbol 13, the hand 25 indicates the airplane mode is set and signal reception is turned off.

The number 1 and symbol 4+ are also along the outside of the range of hand 25 rotation. These symbols are used to indicate the satellite signal reception mode. The hand 25 points to 1 when GPS time information is received and the internal time adjusted (in the timekeeping mode), and points to 4+ when receiving GPS time information and orbit information, calculating the positioning information indicating the current location, and correcting the internal time and time zone (in the positioning mode) as described below.

Hand 26 and hand 27 are disposed to a pivot offset toward 6:00 from the center of the dial 11. Hand 26 indicates the minute of the second time (home time, in this example, the time in Japan when travelling in a different country), and the other hand 27 indicates the hour of the second time.

Hand 28 is disposed to a pivot offset toward 4:00 from the center of the dial 11. This hand 28 indicates whether the second time is ante meridian or post meridian.

The date window 15 is a small rectangular opening in the dial 11 through which the date (number) printed on the date indicator 20 can be seen. The date indicator 20 displays the day value of the current date at the first time with the number that is visible through the date window 15.

Time difference information 37 indicating the time difference to UTC (Coordinated Universal Time) is denoted by numbers and non-numeric symbols around the inside circumference of the dial ring 35.

City name information 36 denoting the name of a city located in the time zone that uses the standard time corresponding to the time difference indicated by the time difference information 37 on the dial ring 35 is expressed beside the time difference information 37 on the bezel 32 surrounding the dial ring 35.

Circuitry Configuration of the Electronic Timepiece

Figure 7:
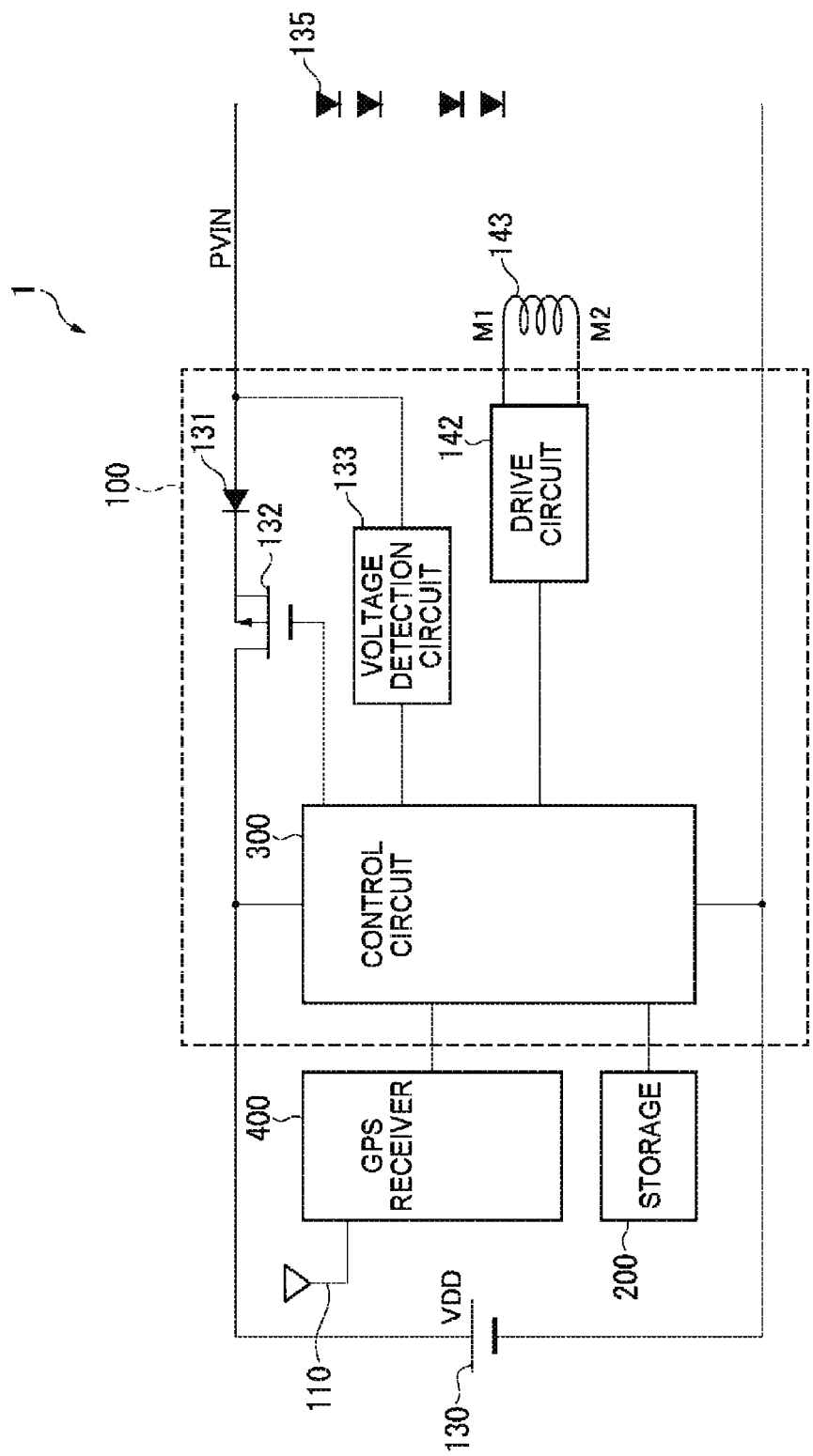
FIG. 7 is a circuit diagram of the electronic timepiece according to the first embodiment.

FIG. 7 is a circuit diagram of the electronic timepiece 1.

As shown in FIG. 7, the electronic timepiece 1 has a control circuit 300 including a CPU (central processing unit), the GPS receiver 400, storage 200, a storage battery 130 as a rechargeable power supply, the solar cell 135, a diode 131, a charging control switch 132, a voltage detection circuit 133, the motor coil 143, and the drive circuit 142. Note that the 130 is charged by current supplied from the solar cell 135.

The GPS receiver 400, storage 200, charging control switch 132, voltage detection circuit 133, and drive circuit 142 are connected to the control circuit 300.

The control circuit 300, diode 131, charging control switch 132, voltage detection circuit 133, and drive circuit 142 embody the control device 100.

Diode

The diode 131 is disposed on a path electrically connected to the solar cell 135 and the storage battery 130, and stops the flow of current (reverse current) from the storage battery 130 to the solar cell 135 without stopping the current flow (forward current) from the solar cell 135 to the storage battery 130. Note that the forward current flow is limited to when the voltage of the solar cell 135 is greater than the voltage of the storage battery 130, that is, when charging. When the voltage of the solar cell 135 becomes less than the voltage of the storage battery 130, the diode 131 prevents current from flowing from the storage battery 130 to the solar cell 135. A field-effect transistor (FET) may be used instead of the diode 131.

Charging Control Switch

The charging control switch 132 opens and closes the path of current from the solar cell 135 to the storage battery 130, and has a switching element disposed to the path that electrically connects the solar cell 135 and the storage battery 130. Current starts flowing when the switching element goes from off to on, and the current path is interrupted when the switching element goes from on to off.

Voltage Detection Circuit

The voltage detection circuit 133 operates based on a control signal that specifies the voltage detection timing, and detects the terminal voltage PVIN of the solar cell 135, that is, the output voltage of the solar cell 135, while the charging control switch 132 is off. The voltage detection circuit 133 then compares the detected voltage with a previously set voltage threshold, receives a 1 signal if the detected voltage is greater than the voltage threshold, and receives a 0 signal if the detected voltage is less than or equal to the voltage threshold. The voltage detection circuit 133 then outputs the received signal to the control circuit 300.

Drive Circuit

The drive circuit 142 is connected to terminals M1 and M2 of the motor coil 143 of a stepper motor in the drive mechanism 140. The drive circuit 142 is controlled by the control circuit 300 to output a pulse to the motor coil 143, drive the drive mechanism 140, and move the hands. When the communication mode described below is enabled, the drive circuit 142 transmits a signal using the magnetic field produced by the motor coil 143 by controlling the pulses output to the motor coil 143.

Electronic Timepiece Functions

Figure 8:
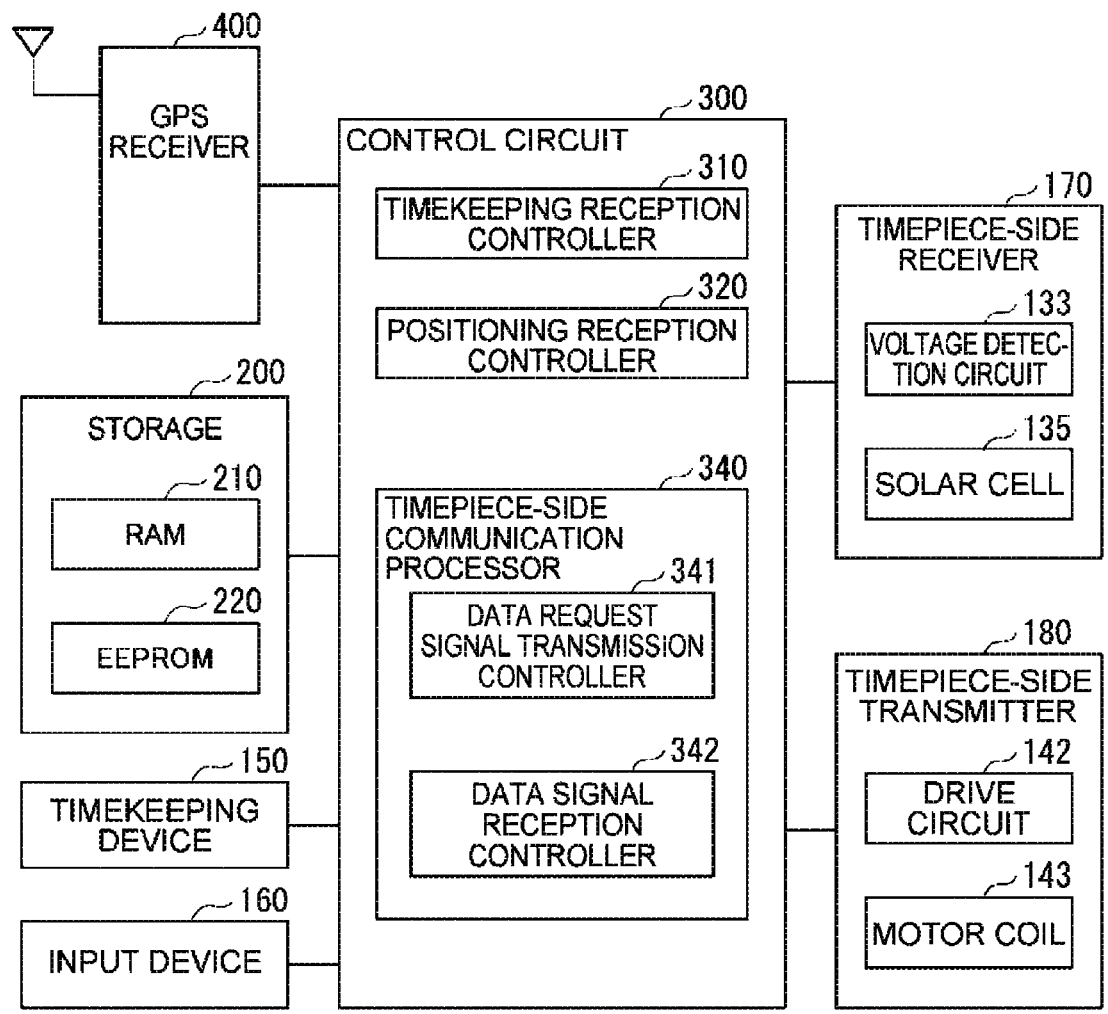
FIG. 8 is a control block diagram of the electronic timepiece according to the first embodiment.

FIG. 8 is a control block diagram of the electronic timepiece 1.

As shown in FIG. 8, the GPS receiver 400, storage 200, timekeeping device 150, input device 160, timepiece-side receiver 170, and timepiece-side transmitter 180 are connected to the control circuit 300.

The timepiece-side receiver 170 is configured with the voltage detection circuit 133 and the solar cell 135 as a photodetector. The timepiece-side transmitter 180 is configured with the drive circuit 142 and the motor coil 143 (an example of a transmission coil). In the accompanying claims, the timepiece-side receiver 170 is an example of an first receiver, and the timepiece-side transmitter 180 is an example of a first transmitter. The timepiece-side receiver 170 and the timepiece-side transmitter 180 are an example of the first communicator.

GPS Receiver

The GPS receiver 400 is connected to the antenna 110, processes satellite signals received through the antenna 110, and acquires GPS time information and positioning information. The antenna 110 receives satellite signals that are transmitted from the GPS satellites and pass through the crystal 33 and dial ring 35 shown in FIG. 5.

While not shown in the figures and similarly to a typical GPS receiver, the GPS receiver 400 includes an RF (radio frequency) circuit that receives and converts satellite signals transmitted from the GPS satellites to digital signals; a baseband circuit that executes a reception signal correlation process and demodulates the navigation data message; and a data acquisition unit that acquires GPS time information and positioning information (navigation data) from the navigation data message (satellite signals) demodulated by the baseband circuit.

Input Device

The input device 160 includes the crown 43, button A 41, and button B 42 shown in FIG. 4. The input device 160 detects operations instructing various processes based on the buttons 41, 42 being pushed and released, and the crown 43 being pulled out and pushed in, and outputs an operating signal corresponding to the detected operation to the control circuit 300.

Timekeeping Device

The timekeeping device 150 includes a crystal oscillator that is driven by power stored in the storage battery 130, and updates the time data using a reference signal based on the oscillation signal from the crystal oscillator.

Storage

The storage 200 includes RAM (random access memory) 210 and an EEPROM (electronically erasable and programmable read only memory) 220 as a nonvolatile memory device. Other types of nonvolatile memory, such as flash memory, may be used instead.

Data Stored in RAM

Figure 9:
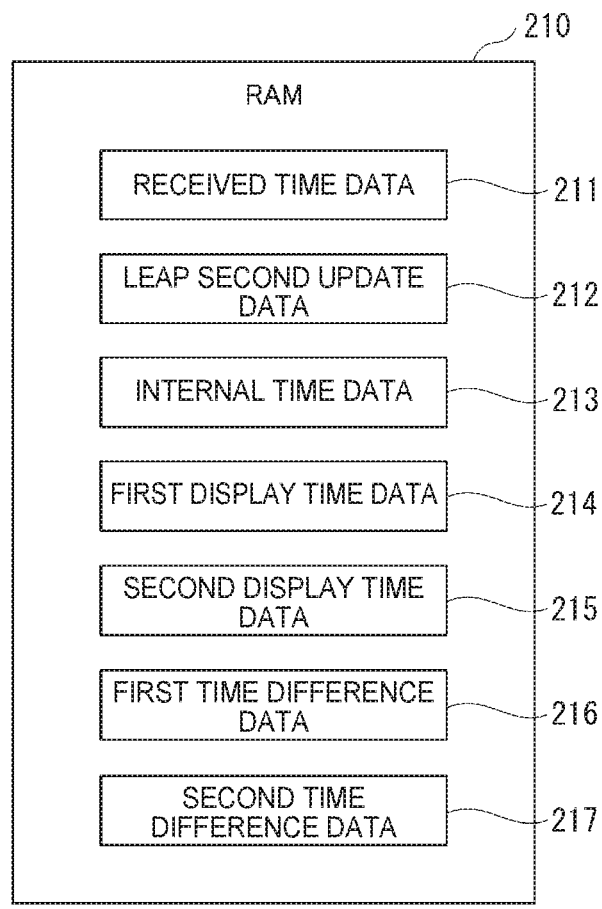
FIG. 9 illustrates the configuration of data stored in RAM in the first embodiment.

As shown in FIG. 9, received time data 211, leap second update data 212, internal time data 213, first display time data 214, second display time data 215, first time difference data 216, and second time difference data 217 are stored in RAM 210.

The received time data 211 stores the time information (GPS time) acquired from GPS satellite signals. The received time data 211 is normally updated every second by the timekeeping device 150, and when a satellite signal is received, the acquired time information is stored as the received time data 211.

The leap second update data 212 stores the current leap second data.

The internal time data 213 stores internal time information. More specifically, the internal time data 213 is updated based on the GPS time stored in the received time data 211 and the current leap second value stored in the leap second update data 212. As a result, UTC is stored as the internal time data 213. When the received time data 211 is updated by the timekeeping device 150, the internal time data is also updated.

The sum of the internal time stored in the internal time data 213, and the time difference of the first time difference data 216, is stored in the first display time data 214. The first time difference data 216 is set according to the time difference that is manually selected by the user or is acquired by reception in the navigation mode. The time expressed by the first display time data 214 is the first time that is displayed by the hands 21, 22, 23.

The second display time data 215 is set to the sum of the internal time expressed by the internal time data 213 and the time difference of the second time difference data 217. The second time difference data 217 is the time difference that is manually set by the user. The time expressed by the second display time data 215 is the second time displayed by the hands 26, 27, 28.

Data Stored in EEPROM

Figure 10:
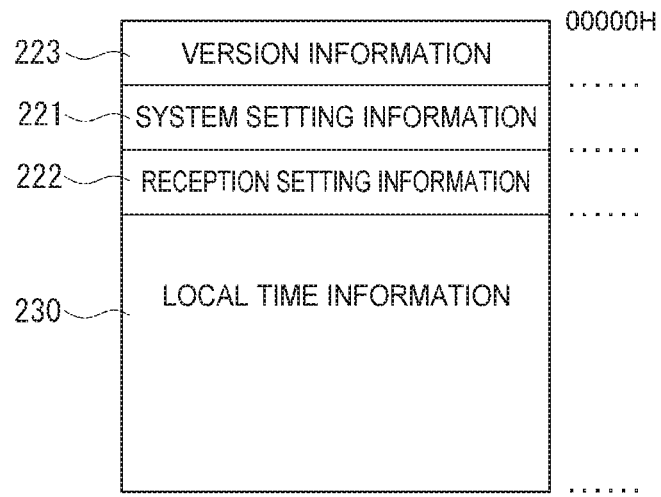
FIG. 10 illustrates the configuration of data stored in EEPROM in the first embodiment.

FIG. 10 shows an example of the structure of data stored in EEPROM 220.

EEPROM 220 stores a program executed by the control circuit 300, and data used when executing the program. More specifically, as shown in FIG. 10, in addition to the system setting information 221 and reception setting information 222 for driving the electronic timepiece 1, local time information 230 described further below and version information 223 indicating the version (edition) of the local time information 230, are stored to specific addresses in EEPROM 220.

Because EEPROM 220 is rewritable, the system setting information 221, reception setting information 222, local time information 230, and version information 223 can be updated.

The system setting information 221 includes the program run by the control circuit 300, parameters such as the rate and stepper motor drive settings, and leap second information including at least the current leap second.

The reception setting information 222 includes parameters used in the reception process of the GPS receiver 400, such as the time interval between automated attempts to receive satellite signals, and the timeout period for terminating the reception process when a satellite signal cannot be locked.

Local Time Information

FIG. 11 shows an example of the data structure of the local time information 230.

The local time information 230 stored in EEPROM 220 relates region information 231 (positioning information) and time difference information 232. When positioning information is acquired in the positioning mode, the control circuit 300 can acquire the time difference information based on the positioning information (latitude and longitude).

The time difference information 232 is information for acquiring the time difference to UTC in each region stored as region information 231, and includes time zone information 2321, time zone change information 2322, DST offset information 2323, DST start information 2324, DST end information 2325, and DST change information 2326.

The region information 231 is information identifying individual regions defined by dividing geographical information into plural regions. Each region is, for example, a rectangular region that is 1000 to 2000 km long east-west and north-south. Note that the geographical information is map information overlaid with time zones. Coordinate data defining each region is stored as the region information 231. More specifically, if each region is a rectangle, the region can be defined by the coordinates (latitude and longitude) of the top left corner and the coordinates (latitude and longitude) of the bottom right corner, and the coordinates for these two points are stored as the region information 231.

The time zone information 2321 identifies the time zone, or more specifically the time difference to UTC, in each region.

The time zone change information 2322 is information indicating a scheduled change in the time zone, and includes the date and time when the time zone of the particular region changes, and the time difference to UTC after the time zone changes. For example, as shown in FIG. 11, the time difference to UTC in region 2 will change from +8 to +9 hours from 2:00 in the morning of 2014 Oct. 26.

The DST offset information 2323 indicates the offset of DST (daylight saving time) in each region.

The DST start information 2324 indicates when DST starts in each region, and DST end information 2325 indicates when DST ends in each region.

The DST change information 2326 is information indicating a scheduled change in DST, and includes the date and time when the DST setting of a particular region changes, and the offset after the change.

For example, as shown in FIG. 11, in region 3, the DST offset is +1 from the last Sunday in March to the last Sunday in October, and the DST offset starting in 2015 is 0.

FIG. 12 shows an example of a change history of the time difference information.

As shown in FIG. 12, when the time zone information, which is time difference information, or the DST information changes, new local time information is created according to the change. New version information is also applied to the new local time information. This version information is information for displaying the version of the local time information by numbers, letters, or symbols. Note that new local time information may be created each time the time zone or DST changes, or according to a specific rule, such as when a specific time has past or there is a change in a specific time zone.

By thus appropriately updating the local time information according to change in the time zone or DST, the time difference to UTC can be more accurately acquired in each region.

Furthermore, by referencing the version information 223 applied to the local time information 230 stored in EEPROM 220, whether or not the local time information 230 is the same version as the most recent local time information, that is, is the newest version, can be easily determined.

Furthermore, when the local time information 230 was last updated, and what was changed, can also be known from the version information 223.

The system setting information 221, reception setting information 222, local time information 230, and version information 223 are stored in EEPROM 220 at the time of manufacture or shipping. This information may also be updated to the latest version by the data communication process described below. When data is updated, all data stored in EEPROM 220 may be replaced, or only the data that changed may be replaced.

Control Circuit

By running programs stored in the storage 200, the control circuit 300 functions as a timekeeping reception controller 310, a positioning reception controller 320, and a timepiece-side communication processor 340 as shown in FIG. 8.

Timekeeping Reception Controller

If the time reaches the automatic reception time that is set for a specific interval, or the amount of light incident to the electronic timepiece 1 exceeds a specific threshold and the electronic timepiece 1 can be determined to be outdoors exposed to sunlight, the timekeeping reception controller 310 determines that the automatic reception condition is met, and operates the GPS receiver 400 to execute the reception process in the timekeeping mode. The timekeeping reception controller 310 also operates the GPS receiver 400 and runs the reception process in the timekeeping mode if button A 41 is pressed for 3 seconds or more and less than 6 seconds to force (manually start) reception in the timekeeping mode. When the reception process runs in the timekeeping mode, the GPS receiver 400 locks onto at least one GPS satellite, receives satellite signals transmitted from that GPS satellite, and acquires time information.

Positioning Reception Controller

If button A 41 is pressed for 6 seconds or more to force (manually start) reception in the positioning mode, the positioning reception controller 320 operates the GPS receiver 400 and runs the reception process in the positioning mode. When the reception process runs in the positioning mode, the GPS receiver 400 locks onto to at least three, and preferably four or more, GPS satellites, receives satellite signals transmitted from those GPS satellites, and computes and acquires positioning information. The GPS receiver 400 can simultaneously acquire time information when receiving the satellite signals in this event.

Note that this embodiment is configured to run the reception process in the timekeeping mode when the automatic reception condition is met, but may be configured to enable selecting running the reception process in the positioning mode.

Timepiece-Side Communication Processor

The timepiece-side communication processor 340 runs a process whereby the electronic timepiece 1 receives data (update data) from the communication device 2. The timepiece-side communication processor 340 includes a data request signal transmission controller 341 and a data signal reception controller 342.

The data request signal transmission controller 341 executes a transmission process that sends a data request signal to the communication device 2. The data signal reception controller 342 executes a reception process that receives the data signal sent from the communication device 2. Each data signal contains one bit of data (update data) sent from the communication device 2.

Note that the data request signal transmission controller 341 is an example of the timepiece-side transmission controller in the accompanying claims. The data signal reception controller 342 is an example of a timepiece-side reception controller in the accompanying claims.

The function units of the control circuit 300 are described below in the description of the communication process of the electronic timepiece 1.

Communication Device Configuration

Figure 13:
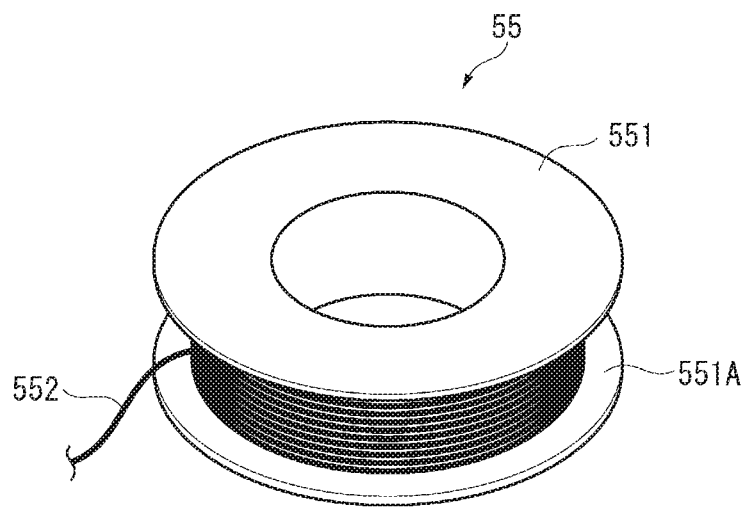
FIG. 13 illustrates the coil of the communication device in the first embodiment.

As described above, the communication device 2 has a stand 53, and a coil 55 such as shown in FIG. 13 is disposed inside the stand 53.

Coil

FIG. 13 illustrates the coil 55 housed inside the communication device 2.

The coil 55 is cylindrical, and has a ferrite core 551 with a channel 551A formed around the outside surface, and a copper wire 552 wound around the channel 551A.

When the magnetic field on the inside circumference side of the copper wire 552 winding changes, a voltage proportional to the field change is induced, and induced current flows through the copper wire 552 in the direction opposing the change in the magnetic field in accordance with Lenz's law.

Figure 14:
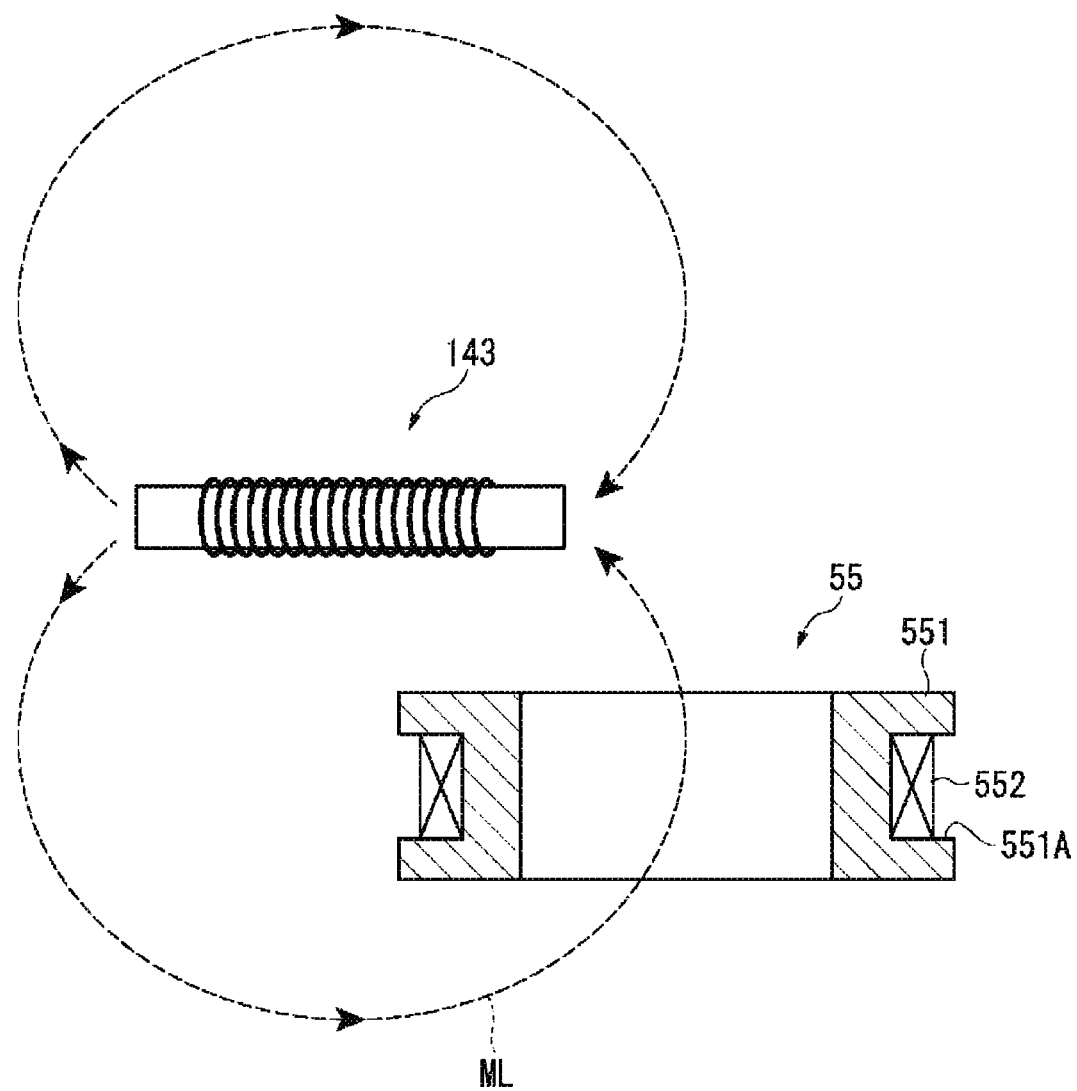
FIG. 14 illustrates the field of the coil in the first embodiment.

FIG. 14 illustrates the magnetic field when the electronic timepiece 1 is placed on the communication device 2.

As shown in FIG. 14, when a pulse is output from the drive circuit 142 of the electronic timepiece 1 to the motor coil 143, magnetic force results and magnetic lines of force ML pass through the coil 55 inside the communication device 2. As a result, the magnetic field inside the coil 55 changes and induced current flows through the copper wire 552.

Light-Emitting Device

Figure 15A:
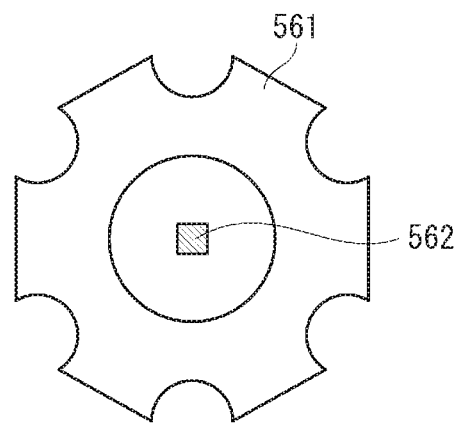
FIGS. 15A-C show the light-emitting device of the communication device in the first embodiment.
Figure 15B:
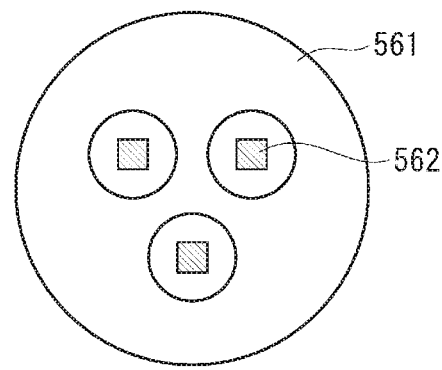
Figure 15C:
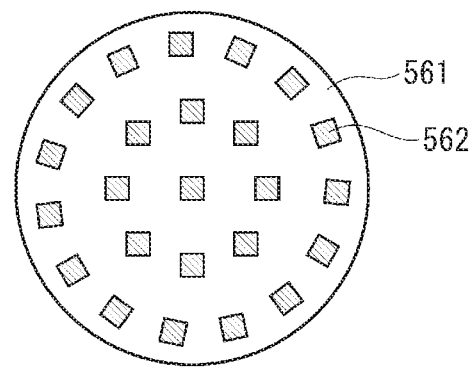

FIGS. 15A-C illustrate the configuration of the light-emitting device 56 in the lamp 541 of the communication device 2.

The light-emitting device 56 includes a metal or ceramic heat dissipating substrate 561, and one or more LEDs 562 disposed to the heat dissipating substrate 561.

FIG. 15 (A) shows an example having a single LED 562 with the single LED 562 disposed in the center of the heat dissipating substrate 561 when seen from the front (emission side) of the heat dissipating substrate 561.

FIG. 15 (B) shows an example having three LEDs 562 with the three LEDs 562 arranged so that imaginary lines connecting each of the LEDs 562 form a triangle when seen from the front of the heat dissipating substrate 561.

FIG. 15 (C) shows an example having numerous LEDs 562 with the LEDs 562 arranged in a pattern radiating from the center of the heat dissipating substrate 561 when seen from the front of the heat dissipating substrate 561. This configuration can illuminate a wide area.

Figure 16:
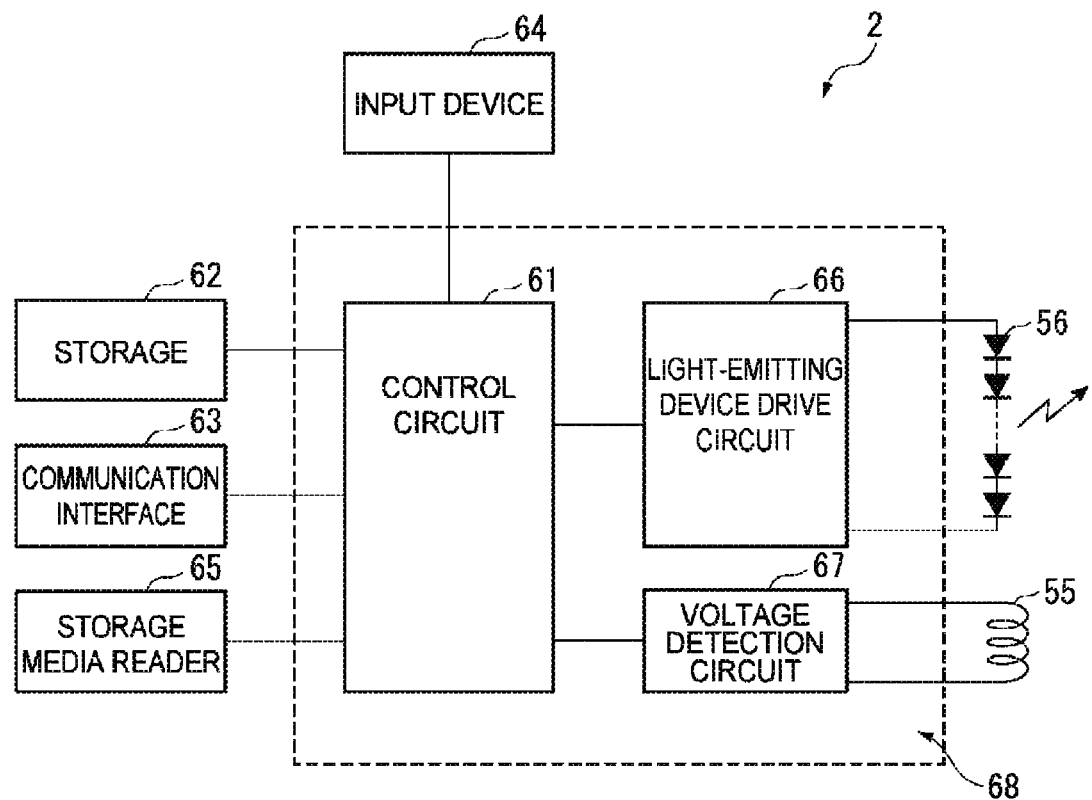
FIG. 16 is a circuit diagram of the communication device in the first embodiment.
Figure 17:
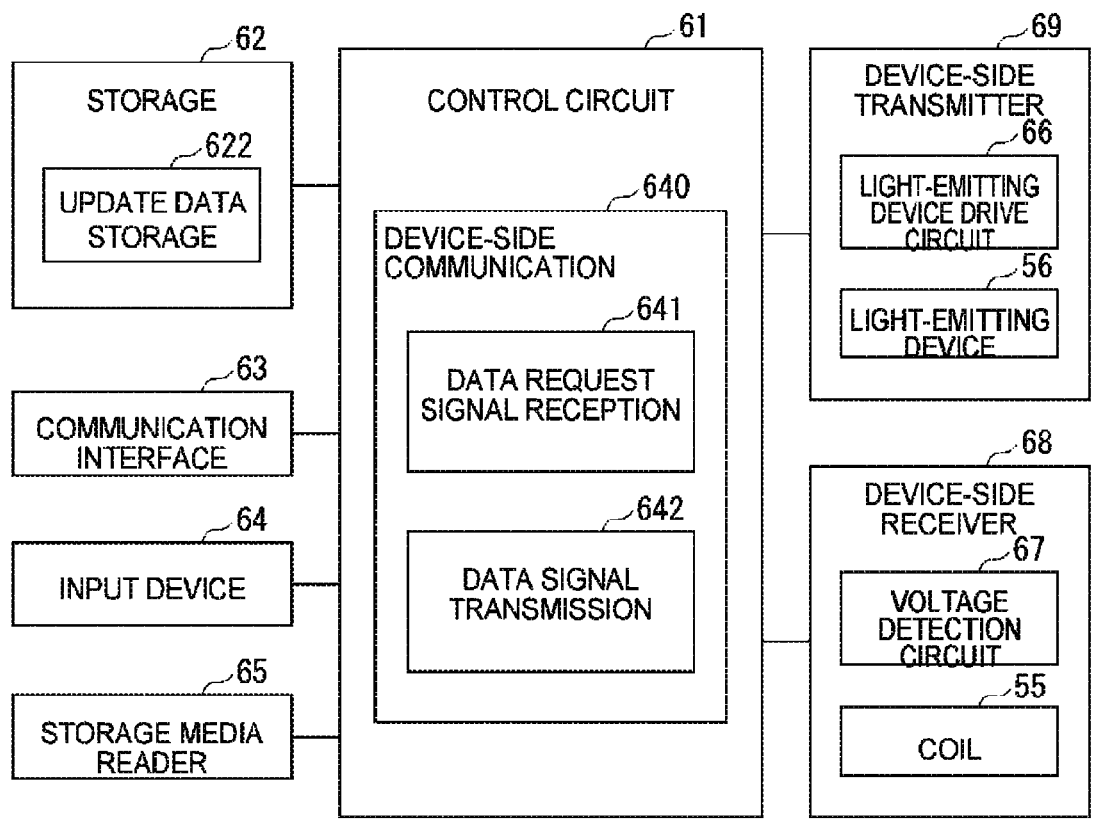
FIG. 17 is a control block diagram of the communication device in the first embodiment.

FIG. 16 is a circuit diagram of the communication device 2, and FIG. 17 is a control block diagram of the communication device 2.

As shown in FIG. 16 and FIG. 17, the communication device 2 includes a control circuit 61 comprising a CPU, a storage 62 comprising RAM, EEPROM, or other nonvolatile memory, a communication interface 63, an input device 64, a storage media reader 65, a light-emitting device drive circuit 66, a voltage detection circuit 67, the coil 55 (reception coil), and a light-emitting device 56.

Voltage Detection Circuit

The voltage detection circuit 67 detects whether or not current (a pulse) was produced in the coil 55 by electromagnetic induction by comparing the induction voltage of the coil 55 with a previously set threshold. More specifically, the voltage detection circuit 67 determines a signal was received if a voltage exceeding the threshold is detected, and outputs the decision to the control circuit 61. The device-side receiver 68 is thus embodied by the coil 55 and voltage detection circuit 67 as shown in FIG. 17. Note that the device-side receiver 68 is an example of second receiver in the accompanying claims.

Light-Emitting Device Drive Circuit

The light-emitting device drive circuit 66 controls driving the light-emitting device 56 as controlled by the control circuit 61, transmits a 1 signal by causing the light-emitting device 56 to emit, and transmits a 0 signal by turning the light-emitting device 56 off. The device-side transmitter 69 is therefore embodied by the light-emitting device drive circuit 66 and light-emitting device 56 as shown in FIG. 17. The device-side transmitter 69 is an example of an second transmitter in the accompanying claims.

Note that the device-side transmitter 69 and device-side receiver 68 are an example of the second communicator in the accompanying claims.

Communication Interface

The communication interface 63 is configured so that it can connect to the Internet or other network, connects to the network as controlled by the control circuit 61, and receives update data from the network. The received update data is stored in the storage 62 by the control circuit 61.

The communication interface 63 is also configured so that it can connect to a personal computer or other electronic device, connects to the electronic device as controlled by the control circuit 61, and receives update data from the electronic device. The received update data is stored in the storage 62 by the control circuit 61.

Input Device

The input device 64 includes button A 571 and button B 572, and outputs an operating signal corresponding to operation of the buttons 571, 572 to the control circuit 61.

Storage Media Reader

The storage media reader 65 is configured to read data stored to storage media such as USB (Universal Serial Bus) memory sticks, SD memory cards, CDs (Compact Disc), and DVDs (Digital Versatile Disk). The storage media reader 65 connects to the storage media as controlled by the control circuit 61, and reads the update data from the stored data. The read update data is stored to the storage 62 by the control circuit 61.

Storage

As shown in FIG. 17, the storage 62 has an update data storage 622.

The update data that is sent to the electronic timepiece 1 is stored in the update data storage 622. The update data may include part or all of the system setting information 221, reception setting information 222, local time information 230, and version information 223 stored to the EEPROM 220 of the electronic timepiece 1.

Control Circuit

The control circuit 61 functions as a device-side communication processor 640 by running programs stored in the storage 62.

The device-side communication processor 640 executes a process that sends data (update data) from the communication device 2 to the electronic timepiece 1. The device-side communication processor 640 includes a data request signal reception controller 641 and a data signal transmission controller 642.

The data request signal reception controller 641 runs a process that receives the data request signal sent from the electronic timepiece 1. The data signal transmission controller 642 runs a process that sends data signals to the electronic timepiece 1. Each data signal contains one bit of data (update data) that is sent to the electronic timepiece 1.

The function of the control circuit 61 are described below in the description of the communication process of the communication device 2.

Communication Process of the Electronic Timepiece

Figure 18:
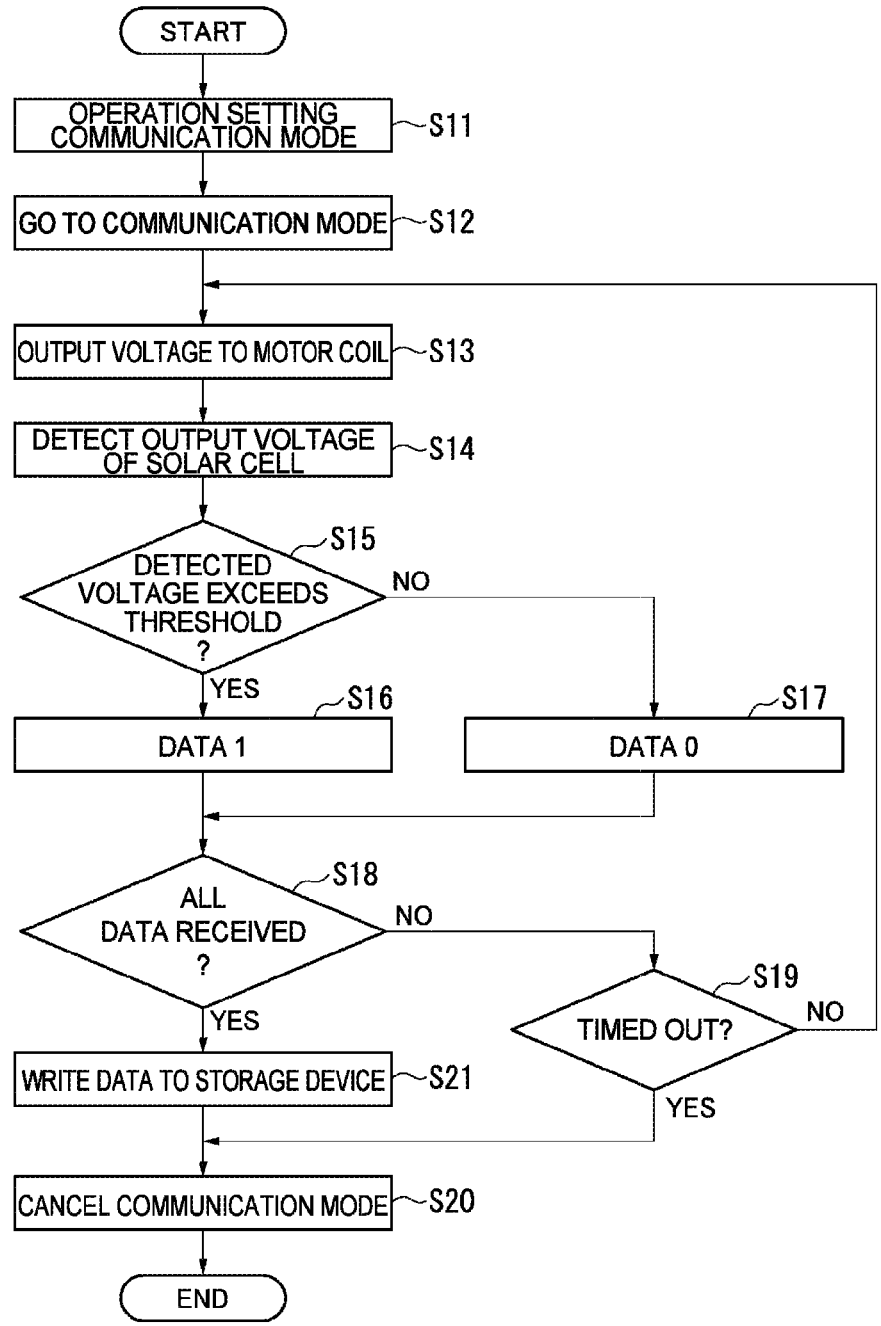
FIG. 18 is a flow chart of the communication process of the electronic timepiece in the first embodiment.

FIG. 18 is a flow chart showing the communication process executed by the electronic timepiece 1.

When the control circuit 300 detects the operation of the input device 160 that sets the communication mode (S11), it operates the timepiece-side communication processor 340 to set the communication mode of the electronic timepiece 1 (S12).

While operating, the timepiece-side communication processor 340 controls the drive circuit 142 of the timepiece-side transmitter 180, and restricts output of pulses other than pulses for sending signals to the motor coil 143. More specifically, the timepiece-side communication processor 340 prevents outputting movement pulses for displaying the time to the motor coil 143. While operating, the timepiece-side communication processor 340 also keeps the charging control switch 132 in the off state.

The timepiece-side communication processor 340 first operates the data request signal transmission controller 341. The data request signal transmission controller 341 controls the drive circuit 142 of the timepiece-side transmitter 180 to output one pulse to the motor coil 143, that is, outputs a voltage and sends a data request signal requesting acquisition of a data signal (S13).

The timepiece-side communication processor 340 then operates the data signal reception controller 342 after the data request signal transmission controller 341 sends the data request signal. The data signal reception controller 342 then controls the voltage detection circuit 133 of the timepiece-side receiver 170 to detect the output voltage of the solar cell 135 and receive one bit of data (S14).

The data signal reception controller 342 determines if the voltage detection circuit 133 detected a voltage higher than the threshold (S15), determines a 1 signal was received if a voltage exceeding the threshold was detected by the voltage detection circuit 133 (S15: YES) (S16), and outputs the reception result to the timepiece-side communication processor 340. However, if a voltage less than or equal to the threshold was detected by the voltage detection circuit 133 (S15: NO), the data signal reception controller 342 determines a 0 signal was detected (S17), and outputs the reception result to the timepiece-side communication processor 340. The data signal reception controller 342 also stores the received signal to RAM 210.

After the data signal reception controller 342 has received data, the timepiece-side communication processor 340 determines if all update data sent from the communication device 2 has been received (S18). Note that because the size of the update data, that is, the number of bits, is predetermined, the timepiece-side communication processor 340 can determine if all update data has been received by calculating the size (number of bits) of all data received. The timepiece-side communication processor 340 then outputs the decision to the control circuit 300.

If all update data has not been received by the timepiece-side communication processor 340 (S18: NO), the control circuit 300 determines if the operating time of the timepiece-side communication processor 340 has exceeded a timeout time previously set for the data communication process, that is, if the communication process has timed out (S19).

If S19 returns YES, it can be determined that conditions do not enable the data communication process to succeed, and the control circuit 300 therefore stops operation of the timepiece-side communication processor 340 and ends (cancels) the communication mode to prevent further power consumption (S20).

However, if S19 returns NO, the control circuit 300 returns to step S13. The process of steps S13 to S19 therefore repeats unless step S18 returns YES or S19 returns YES.

If the control circuit 300 determines that all update data was received by the timepiece-side communication processor 340 (S18: YES), the control circuit 300 writes the received data to EEPROM 220 (S21). The control circuit 300 then stops operation of the timepiece-side communication processor 340 and ends the communication mode (S20).

Communication Process of the Communication Device

Figure 19:
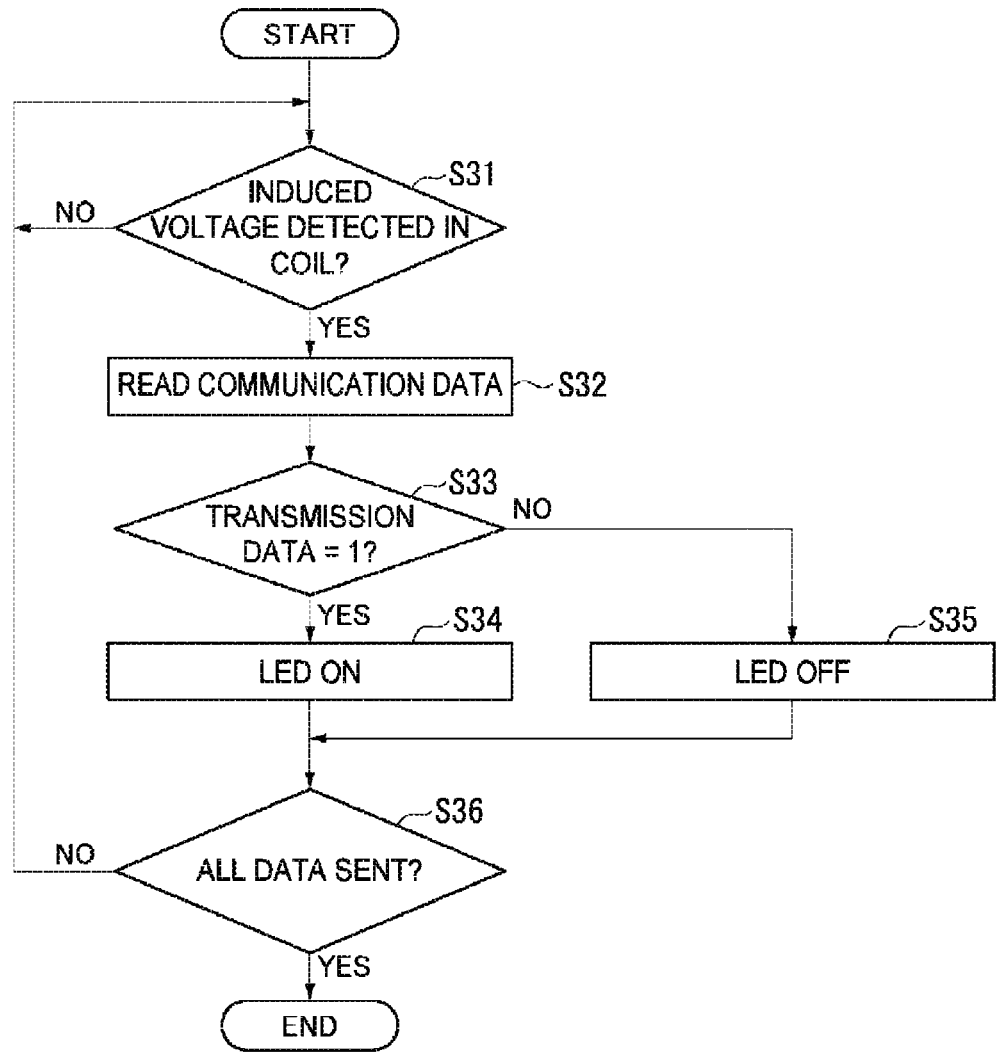
FIG. 19 is a flow chart of the communication process of the communication device in the first embodiment.

FIG. 19 is a flow chart of the communication process run by the communication device 2.

Before communicating with the electronic timepiece 1, the control circuit 61 of the communication device 2 reads the data to update from an external source through the communication interface 63 or storage media reader 65, and stores the update data in the storage 62.

The control circuit 61 then operates the device-side communication processor 640 when it detects that the button A 571 was pressed and the communication operation instructing starting communication with the electronic timepiece 1 was performed.

The device-side communication processor 640 first operates the data request signal reception controller 641, and the data request signal reception controller 641 controls the voltage detection circuit 67 to detect if the induced voltage produced by the coil 55 exceeds a set threshold, and determines if a data request signal was received by the device-side receiver 68 (S31).

The data request signal reception controller 641 repeats the data request signal reception evaluation step S31 until step S31 returns YES.

When the data request signal reception controller 641 returns YES in S31, the device-side communication processor 640 operates the data signal transmission controller 642, and the data signal transmission controller 642 reads one bit of data from the update data stored in the update data storage 622 (S32).

The data signal transmission controller 642 then determines if the signal that was read is a 1 signal (S33).

If S33 returns YES, the data signal transmission controller 642 controls the light-emitting device drive circuit 66 of the device-side transmitter 69 to turn the LED of the light-emitting device 56 on and transmit a 1 signal (S34).

If S33 returns NO, the data signal transmission controller 642 controls the light-emitting device drive circuit 66 to turn the LED of the light-emitting device 56 off and transmit a 0 signal (S35).

Next, the device-side communication processor 640 determines if all update data has been transmitted (S36). If S36 returns NO, the device-side communication processor 640 returns to S31. The device-side communication processor 640 then repeats steps S31 to S36 until S36 returns YES.

When S36 returns YES, the control circuit 61 returns to the normal movement mode.

The signal output timing when transmitting update data is described next.

As shown in FIGS. 20A-F, when the electronic timepiece 1 outputs a pulse to the motor coil 143 and transmits the data request signal at time T1, a pulse is generated in the coil 55 of the communication device 2 by electromagnetic coupling, and the communication device 2 receives the data request signal. When the data request signal is received, the communication device 2 controls the light-emitting device drive circuit 66 to transmit the update data one bit at a time. In the example in FIGS. 20A-F, because a 1 signal is output as the data signal, the data signal transmission controller 642 controls the light-emitting device drive circuit 66 to turn the light-emitting device 56 on and send a 1 signal.

When the light-emitting device 56 is on, the solar cell 135 of the electronic timepiece 1 receives the light emitted from the light-emitting device 56, and the output voltage of the solar cell 135 rises.

The data signal reception controller 342 then controls the voltage detection circuit 133 to detect the output voltage of the solar cell 135. The data signal reception controller 342 sends an operating pulse to the voltage detection circuit 133 at a voltage detection timing of a constant interval, the voltage detection circuit 133 operates at the operating pulse input at the voltage detection timing of time T2, and the voltage detection circuit 133 outputs a 1 signal if the output voltage of the solar cell 135 exceeds a specific threshold (such as a voltage corresponding to 10,000 Lx). In the example in FIGS. 20A-F F, the output voltage of the solar cell 135 exceeds the threshold at time T2, and the voltage detection circuit 133 therefore outputs a 1 signal. Note that evaluation of the reception signal is completed at the falling edge of the operating pulse of the voltage detection circuit 133.

Next, the data request signal transmission controller 341 of the electronic timepiece 1 outputs a pulse to the motor coil 143 and transmits the data request signal at time T3, which is the data request signal transmission interval.

Each time a data request signal is thus sent from the electronic timepiece 1 to the communication device 2, the update data is sent one bit at a time from the communication device 2 to the electronic timepiece 1.

When the communication process ends, the control circuit 300 of the electronic timepiece 1 outputs a movement pulse to the motor coil 143, and moves the hands, which were stopped during the communication process, to display the current time.

Operating Effect of Embodiment 1

Because the communication path for sending signals from the electronic timepiece 1 to the communication device 2, and the communication path for sending signals from the communication device 2 to the electronic timepiece 1, are two separate paths using mutually different communication methods, two-way (full duplex) communication is possible, and there is no interference between signals sent from the electronic timepiece 1 to the communication device 2 and signals sent from the communication device 2 to the electronic timepiece 1. There is also no need for a process to switch the signal transmission direction as there is when using only a single communication path (such as in half-duplex communication), signals can be sent simultaneously from the electronic timepiece 1 to the communication device 2 and from the communication device 2 to the electronic timepiece 1, and the communication process between the electronic timepiece 1 and communication device 2 can be executes more quickly.

Furthermore, because different communication methods are used on each communication path, there is no interference between signals being sent and signals being received in the electronic timepiece 1 even if the timepiece-side transmitter 180 and the timepiece-side receiver 170 are close together.

Furthermore, because the electronic timepiece 1 transmits signals based on whether or not a pulse is output to the motor coil 143, power consumption can be reduced compared with transmitting signals by turning a light-emitting device on and off.

Furthermore, because the timepiece-side receiver 170 is configured using the solar cell 135 of the electronic timepiece 1 for generating power, there is no need to provide a separate photodetector, and an increase in the parts count and cost can be suppressed.

Furthermore, because the timepiece-side transmitter 180 is configured using the motor coil 143 that drives the drive mechanism of the electronic timepiece 1, there is no need to provide a separate coil, and an increase in the parts count and cost can be suppressed.

Furthermore, because the timepiece-side communication processor 340 restricts output of pulses other than pulses for sending signals to the motor coil 143, such as movement pulses for displaying the time, while operating, transmission of signals from the electronic timepiece 1 that are not related to the communication process can be suppressed during the communication process. The communication process can therefore execute more reliably.

Note that because pulses for signal transmission have less energy than movement pulses, signal transmission pulses have a narrower pulse width than movement pulses. Plural movement pulses are also required to move the hands. As a result, the hands do not move even when a signal transmission pulse is output to the motor coil 143.

Because the electronic timepiece 1 receives a data signal from the communication device 2 each time it outputs a data request signal to the communication device 2, the data signal transmission and reception timing can be reliably synchronized between the communication device 2 and the electronic timepiece 1. The electronic timepiece 1 can also reliably receive data signals sent from the communication device 2.

Furthermore, by the electronic timepiece 1 not sending a data request signal when the electronic timepiece 1 is executing a timekeeping process, for example, and cannot execute the signal reception process, operation can be controlled so that data signals are not sent from the communication device 2. Data signals being dropped can therefore be prevented.

Furthermore, because the data signal reception controller 342 stores signals received in the reception process in EEPROM 220, which is nonvolatile memory, the signals stored in the EEPROM 220 are not erased even when the electronic timepiece 1 is reset, and there is no need to resend the same signals from the communication device 2 to the electronic timepiece 1.

For example, when a motor used in the timepiece is changed, the waveform of the motor drive pulses used to drive the motor must be changed. Parameters that may be changed are therefore generally stored in rewritable nonvolatile memory.

The communication system 10 also sends parameters such as rate information, stepper motor drive settings, the automatic satellite signal reception interval of the reception process, and the timeout time from the communication device 2 to the electronic timepiece 1. As a result, parameters that are stored in EEPROM 220, which is nonvolatile memory, can also be rewritten.

Because the storage capacity of nonvolatile memory devices has increased greatly, nonvolatile memory can now be used to store the program that controls operation of the timepiece.

The communication system 10 also sends the program for operating the electronic timepiece 1 as update data from the communication device 2 to the electronic timepiece 1. As a result, the program stored in EEPROM 220 can also be rewritten.

Keeping the local time information storing the time zone information and daylight saving time information updated to the most recent information is also particularly desirable in timepieces with a GPS receiver. As a result, the local time information is also stored in rewritable nonvolatile memory.

When time zone settings or daylight saving time settings change, the communication system 10 also sends the time zone information and daylight saving time information as update data from the communication device 2 to the electronic timepiece 1. As a result, the local time information stored in EEPROM 220 can also be rewritten.

Because the light-emitting device 56 and coil 55 are disposed as a set in the communication device 2, signals can be sent and received between the communication device 2 and the electronic timepiece 1 by simply placing the electronic timepiece 1 on the stand 53 of the communication device 2.

Furthermore, because the light-emitting device 56 of the communication device 2 is disposed on the same side as the crystal 33 of the electronic timepiece 1 placed on the communication device 2, light emitted from the light-emitting device 56 can pass through the crystal 33 to the solar cell 135 of the electronic timepiece 1.

Furthermore, by disposing the coil 55 of the communication device 2 on the back cover 34 side of the electronic timepiece 1, the coil 55 is closer to the motor coil 143 of the electronic timepiece 1 than if disposed to the crystal 33 side of the electronic timepiece 1, and signals can be sent more reliably from the electronic timepiece 1 to the communication device 2.

Furthermore, because the light-emitting device 56 remains continuously on when button B of the communication device 2 is pressed, the storage battery 130 of the electronic timepiece 1 can be charged. In other words, the communication device 2 can be used as a device for charging the electronic timepiece 1.

Because the communication device 2 and electronic timepiece 1 communicate wirelessly, the operator does not need to remove the back cover of the timepiece and remove the circuit board on which the nonvolatile memory is mounted from the case in order to rewrite data in the EEPROM 220. The operator therefore does not need to go to the trouble of removing the circuit board from the case. The operator also does not need to remove dust or other foreign matter that may get into the case while the case is open, and does not need to test for water resistance after the back cover is replaced.

Furthermore, because data communication between the electronic timepiece 1 and communication device 2 depends on producing a pulse in the motor coil 143 or turning the light-emitting device on, the communication process is simpler than when data is communicated by signal modulation, for example. Power consumption by the communication process can therefore be reduced in the electronic timepiece 1.

Embodiment 2

The electronic timepiece according to the second embodiment differs from the electronic timepiece 1 of the first embodiment in the timing when data received in the reception process is written to EEPROM 220. Other aspects of its configuration are the same as in the first embodiment.

Figure 21:
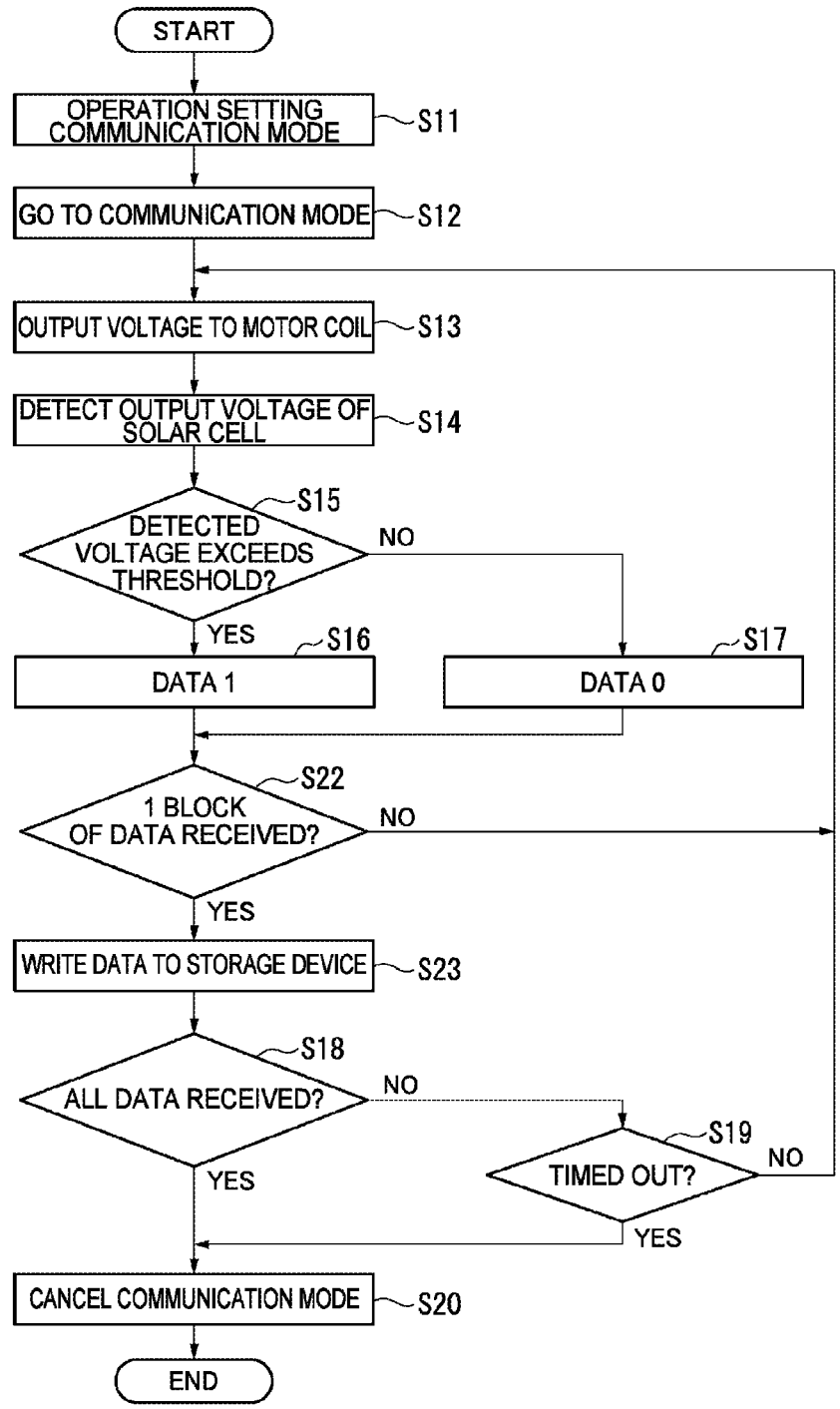
FIG. 21 is a flow chart of the communication process of the communication device in the second embodiment.

FIG. 21 is a flow chart of the communication process executed by the electronic timepiece according to the second embodiment.

The electronic timepiece executes a process of steps S11 to S20, S22, and S23. Because steps S11 to S20 are the same as in the first embodiment, further description thereof is omitted.

In the communication process of the second embodiment, a data signal is received in step S16 or S17 and stored to RAM 210, and the timepiece-side communication processor 340 then determines if a one-block portion of the update data sent from the communication device 2 was received (S22). One block in this example is the unit for writing data to the EEPROM 220, and is predetermined by the specifications of the EEPROM 220. One block may be 1 byte or 128 bytes, for example.

If S22 returns NO, the control circuit 300 returns to step S13.

However, if S22 returns YES, the control circuit 300 writes the one block of data that was received to EEPROM 220 (S23). Then in S18, the timepiece-side communication processor 340 determines if all update data has been received. If S18 returns YES, the control circuit 300 stops operation of the timepiece-side communication processor 340 and ends the communication mode (S20).

Operating Effect of Embodiment 2

The timepiece-side communication processor 340 writes the data stored in RAM 210 to EEPROM 220 whenever one block of data signals, which is the unit for writing data to EEPROM 220, has been received. For example, if data is written to EEPROM 220 after all update data has been received and stored in RAM 210, data must be sequentially read in one block units from the update data stored in RAM 210 and written to EEPROM 220. In this embodiment, however, this reading process is unnecessary, data stored in RAM 210 can be written directly to EEPROM 220, the time required to write data to EEPROM 220 can therefore be shortened, and power consumption by the write process can be reduced.

Embodiment 3

An electronic timepiece 1A according to a third embodiment is a solar-powered wristwatch without the ability to receive satellite signals from GPS satellites.

Figure 22:
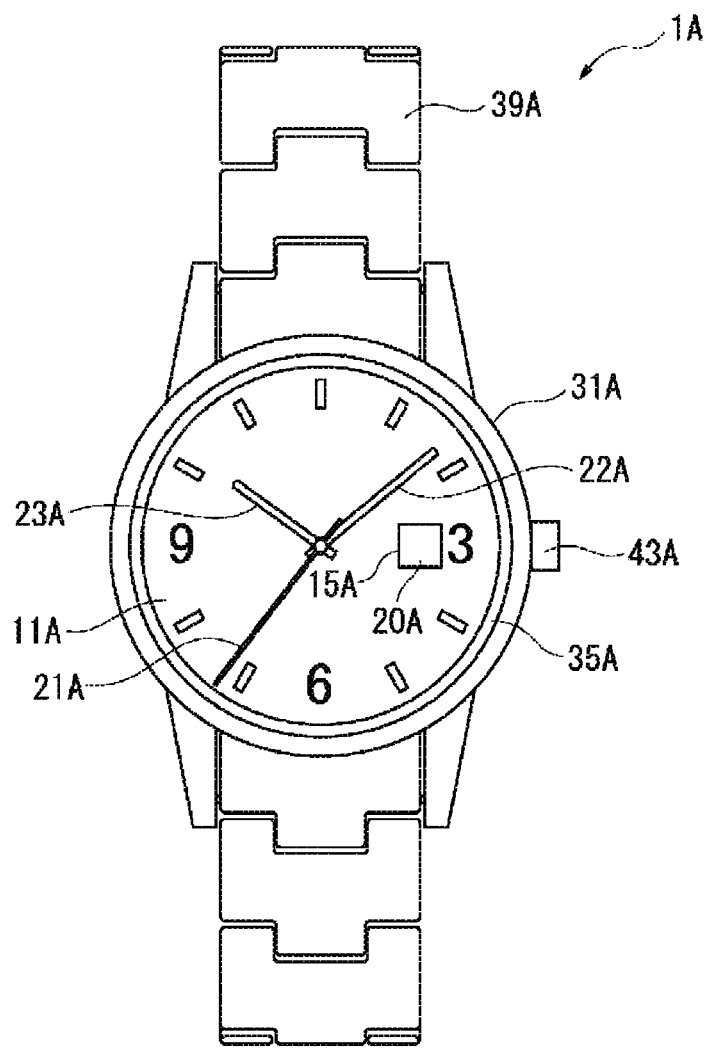
FIG. 22 is a plan view of an electronic timepiece according to a third embodiment.
Figure 23:
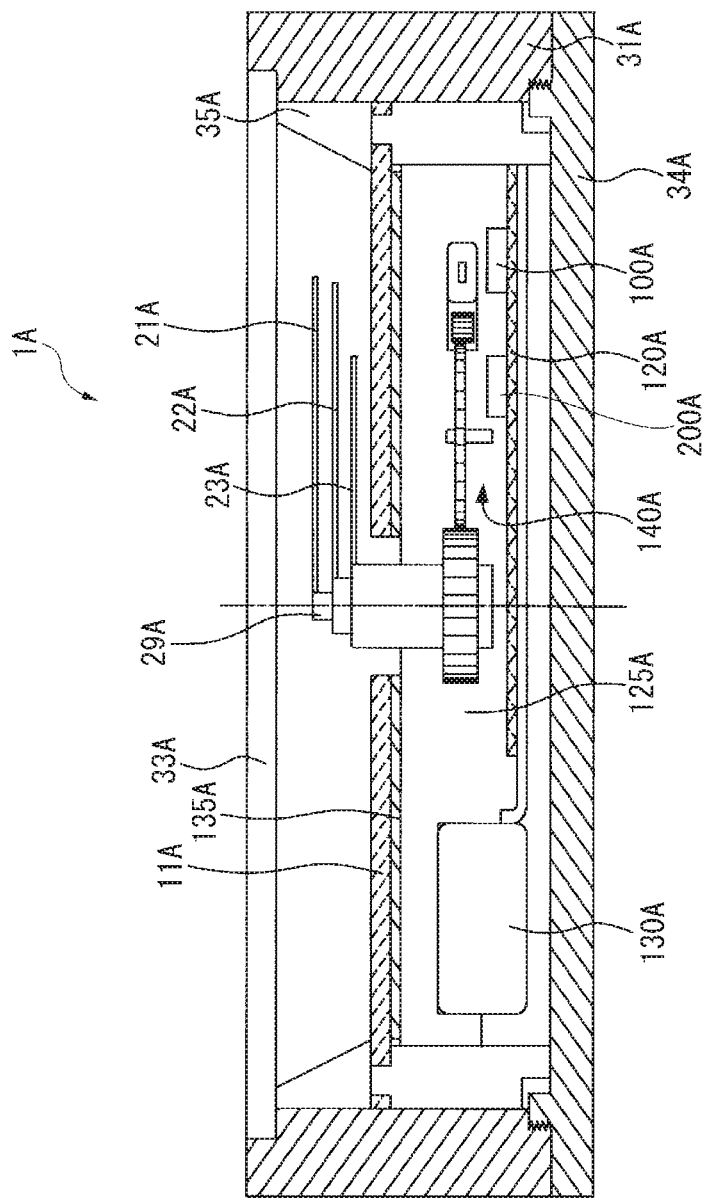
FIG. 23 is a section view the electronic timepiece according to a third embodiment.

FIG. 22 shows the face of the electronic timepiece 1A, and FIG. 23 is a section view of the electronic timepiece 1A.

As shown in FIG. 22 and FIG. 23, the electronic timepiece 1A has a case member 31A to which a band 39A is attached, a crystal 33A, and a back cover 34A. A crown 43A is disposed on the side of the case member 31A.

As shown in FIG. 23, a dial ring 35A, dial 11A, hands 21A (second hand), 22A (minute hand), and 23A (hour hand), date indicator 20A, and a drive mechanism 140A that drives the hands and date indicator 20A are disposed inside the case member 31A.

A solar cell 135A is disposed between the dial 11A and the main plate 125A to which the drive mechanism 140A is attached. Through-holes through which the center arbor 29A of the hands 21A, 22A, 23A, and an aperture for the date window 15A, are formed in the dial 11A, solar cell 135A, and main plate 125A.

The drive mechanism 140A is disposed to the main plate 125A, and is covered by a circuit board 120A from the back side. The drive mechanism 140A includes a stepper motor and wheel train, and drives the hands by the stepper motor rotationally driving the pivots through the wheel train.

The drive mechanism 140A more specifically includes first to third drive mechanisms. The first drive mechanism drives the minute hand 22A and hour hand 23A; the second drive mechanism drives the second hand 21A; and the third drive mechanism drives the date indicator 20A.

The circuit board 120A has a control device 100A, and a storage 200A. A storage battery 130A is disposed between the main plate 125A and the back cover 34A.

Figure 24:
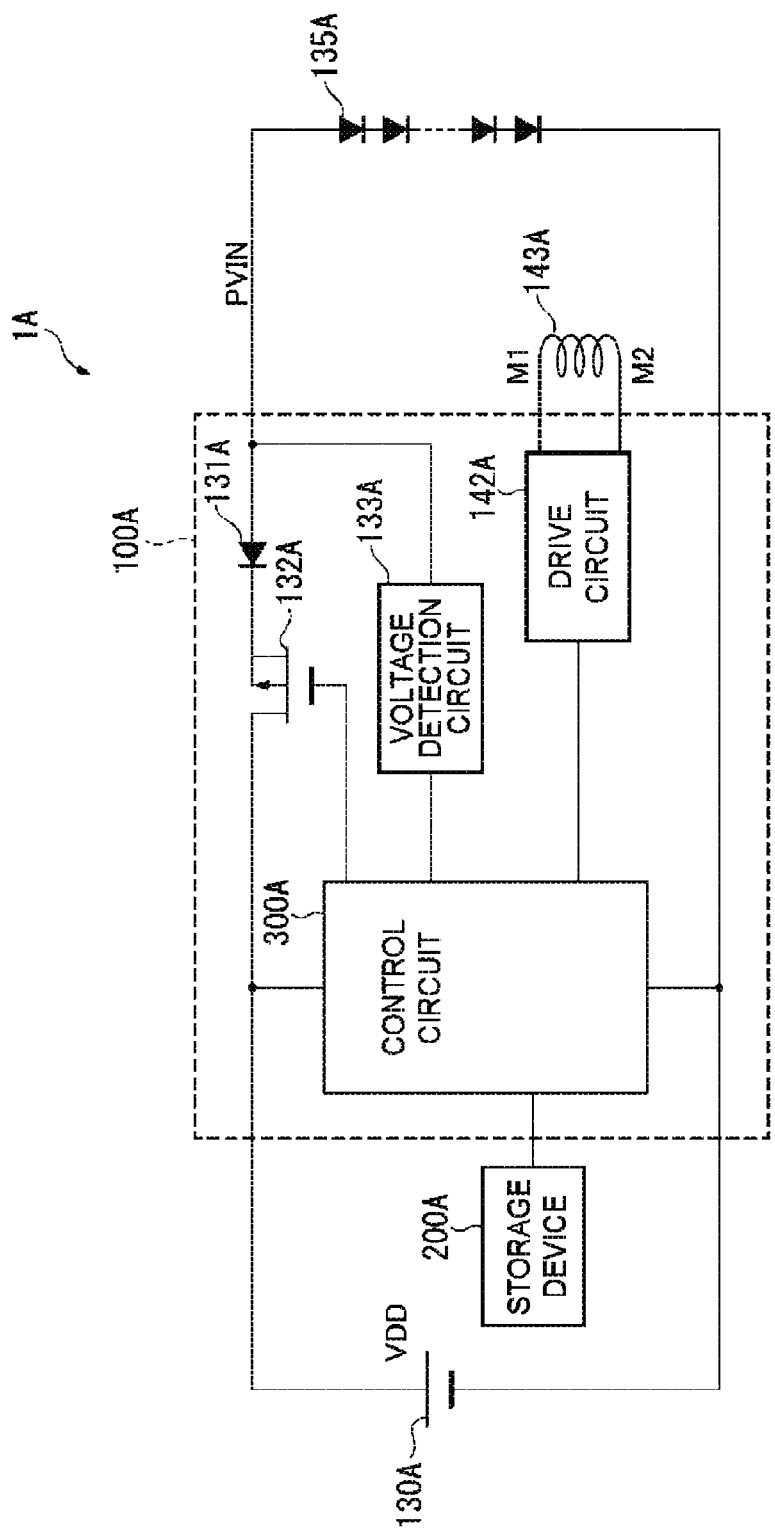
FIG. 24 is a circuit diagram of the electronic timepiece according to a third embodiment.

FIG. 24 is a circuit diagram of the electronic timepiece 1A.

As the electronic timepiece 1 according to the first embodiment, this electronic timepiece 1A has a control circuit 300A, storage 200A, a storage battery 130A as a rechargeable power supply, a solar cell 135A, a diode 131A, a charging control switch 132A, a voltage detection circuit 133A, a motor coil 143A, and the drive circuit 142A.

The control circuit 300A, diode 131A, charging control switch 132A, voltage detection circuit 133A, and drive circuit 142A embody the control device 100A.

The control circuit 300A does not have the ability to receive satellite signals from GPS satellites, or to correct the internal time based on received time information or positioning information calculated from received satellite signals, but otherwise functions identically to the control circuit 300 of the first embodiment. More specifically, the control circuit 300A has a timepiece-side communication processor identical to that of the control circuit 300 in the first embodiment.

Parameters such as the rate information and stepper motor drive settings, and programs for controlling operation of the electronic timepiece 1A, are transmitted as update data from the communication device 2 to the electronic timepiece 1A.

The communication system of the third embodiment thus comprised has the same operational effect as the first embodiment.

Other Embodiments

The invention is not limited to the embodiments described above, and can be modified and improved in many ways without departing from the scope of the accompanying claims.

Figure 25:
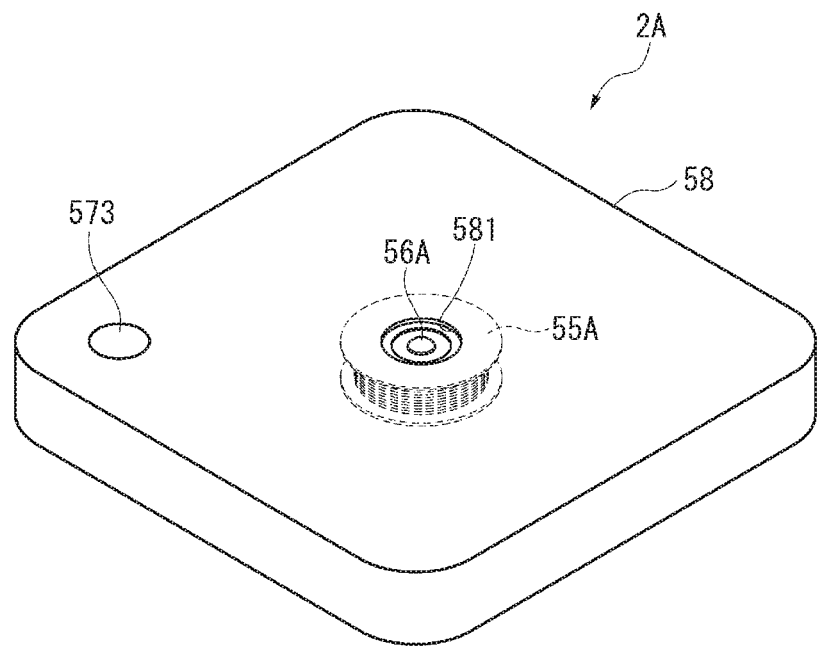
FIG. 25 is an external view of a communication device according to another example.
Figure 26:
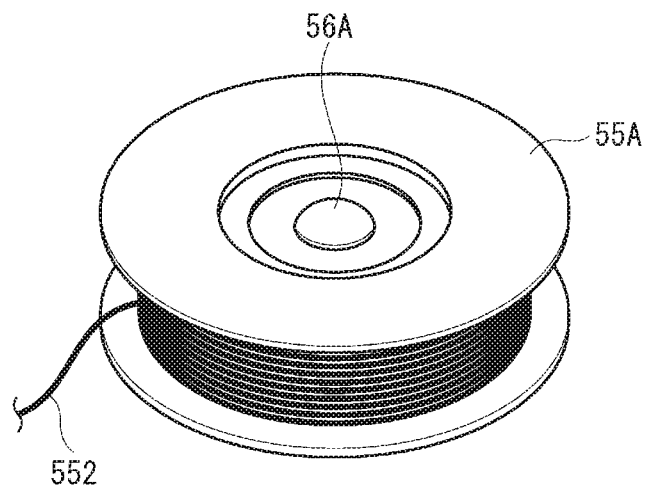
FIG. 26 illustrates a coil and light-emitting device built into a communication device in this other example.

FIG. 25 is an oblique view illustrating the communication device 2A in one variation of the foregoing embodiments. FIG. 26 illustrates the coil 55A and light-emitting device 56A inside the communication device 2A.

The communication device 2A has a stand 58, and the coil 55A and light-emitting device 56A are disposed inside the stand 58. A power button 573 is disposed on the surface of the stand 58.

An opening 581 is formed in the center of the stand 58 as seen from the top, and the light-emitting device 56A is exposed through this opening 581.

As shown in FIG. 25 and FIG. 26, the light-emitting device 56A is disposed in unison with the coil 55A. More specifically, the light-emitting device 56A is disposed on the inside circumference side of the copper wire 552 winding of the coil 55A.

Figure 27:
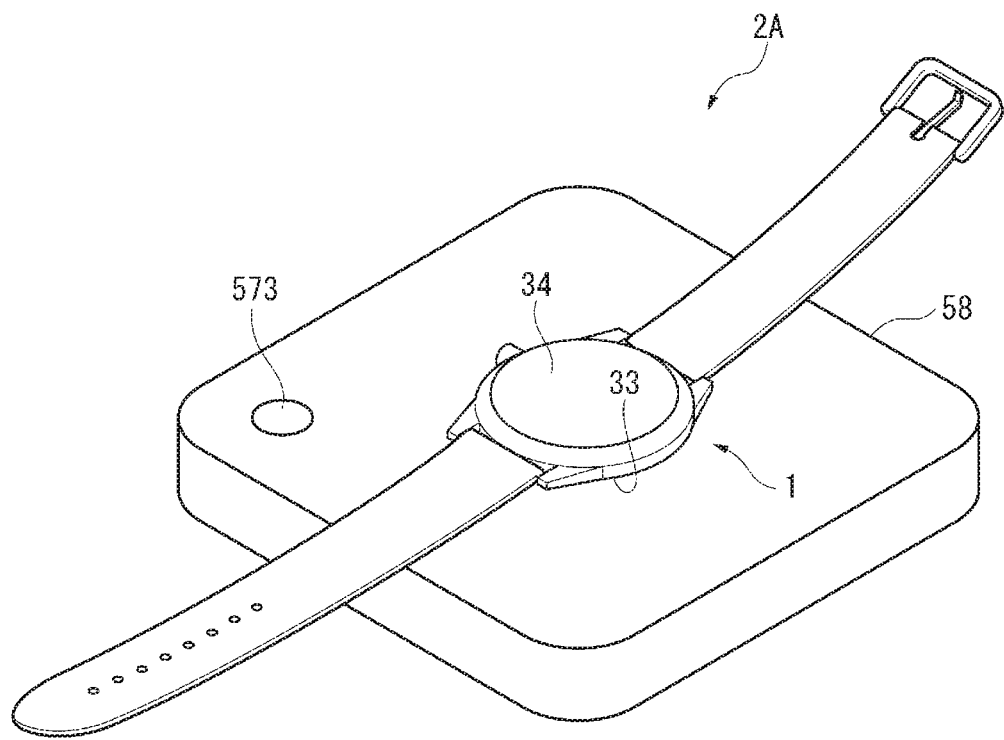
FIG. 27 shows an electronic timepiece placed on the communication device in this other example.

When the operator sets the electronic timepiece 1 on the communication device 2A, the electronic timepiece 1 is placed with the crystal 33 side facing the surface of the stand 58 as shown in FIG. 27. The electronic timepiece 1 is also placed so that the electronic timepiece 1 is on top of the light-emitting device 56A when seen from the top of the stand 58.

In this communication device 2A, the magnetic lines of force produced by the motor coil 143 of the electronic timepiece 1 pass primarily through the crystal 33 and through the inside of the coil 55A of the communication device 2A. Light emitted from the light-emitting device 56A passes through the crystal 33 and is incident to the solar cell 135 of the electronic timepiece 1.

As a result, signals can be sent and received between the communication device 2A and the electronic timepiece 1.

Figure 28:
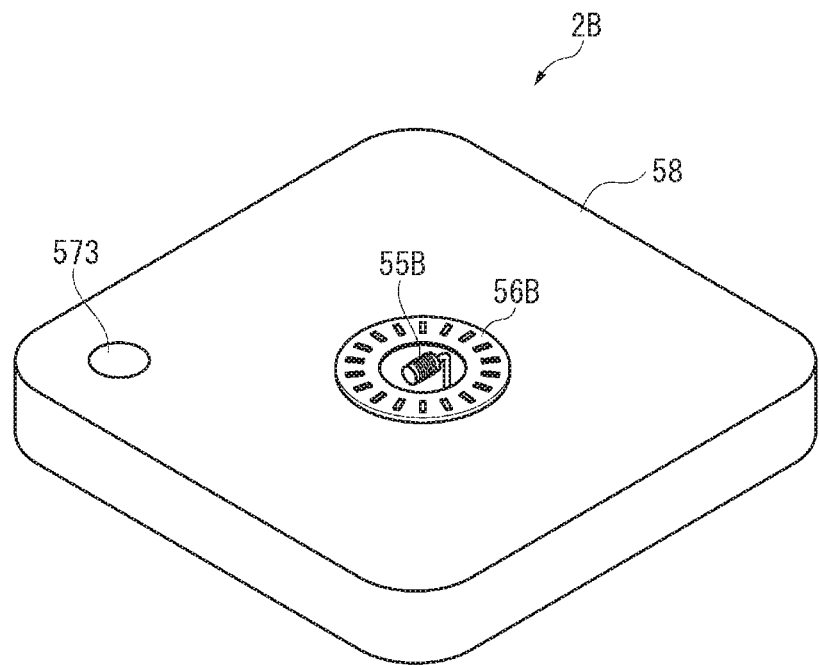
FIG. 28 is an external view of the communication device in this other example.
Figure 29:
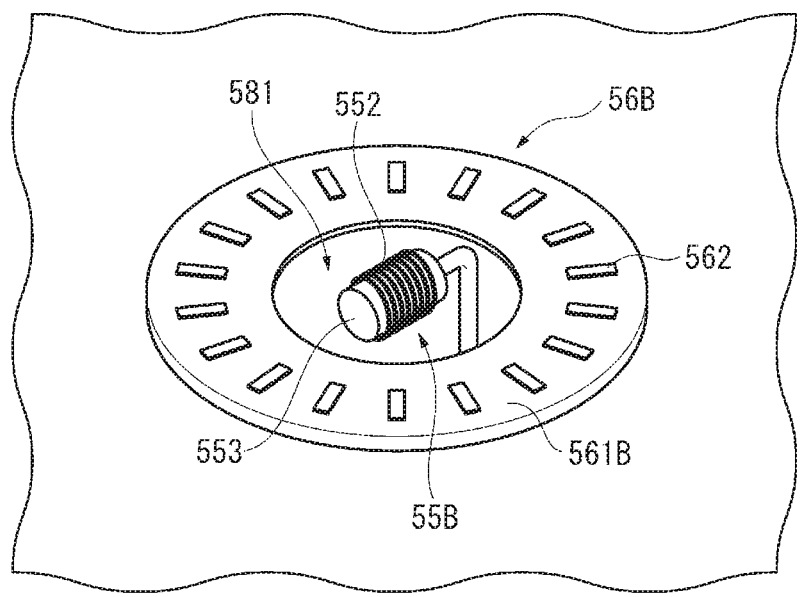
FIG. 29 is an enlarged view of part of FIG. 28.

FIG. 28 is an oblique view illustrating the communication device 2B in another variation of the foregoing embodiments. FIG. 29 is an enlarged view of part of FIG. 28.

This communication device 2B has a stand 58, a coil 55B inside the stand 58, and a light-emitting device 56B disposed in the surface of the stand 58.

The coil 55B has a rod-shaped ferrite core 553, and a copper wire 552 wound around the outside of the ferrite core 553.

The coil 55B is exposed through an opening 581 in the stand 58, and the axis of the ferrite core 553 is aligned with the surface of the stand 58.

The light-emitting device 56B has a ring-shaped heat dissipating substrate 561B, and multiple LEDs 562 disposed in the surface of the heat dissipating substrate 561B along the outside. The light-emitting device 56B is disposed so that the coil 55B is on the inside circumference side of the heat dissipating substrate 561B.

When the operator sets the electronic timepiece 1 on the communication device 2B, the electronic timepiece 1 is placed with the crystal 33 side facing the surface of the stand 58. The electronic timepiece 1 is also placed so that the electronic timepiece 1 is on top of the coil 55B when seen from the top of the stand 58.

Figure 30:
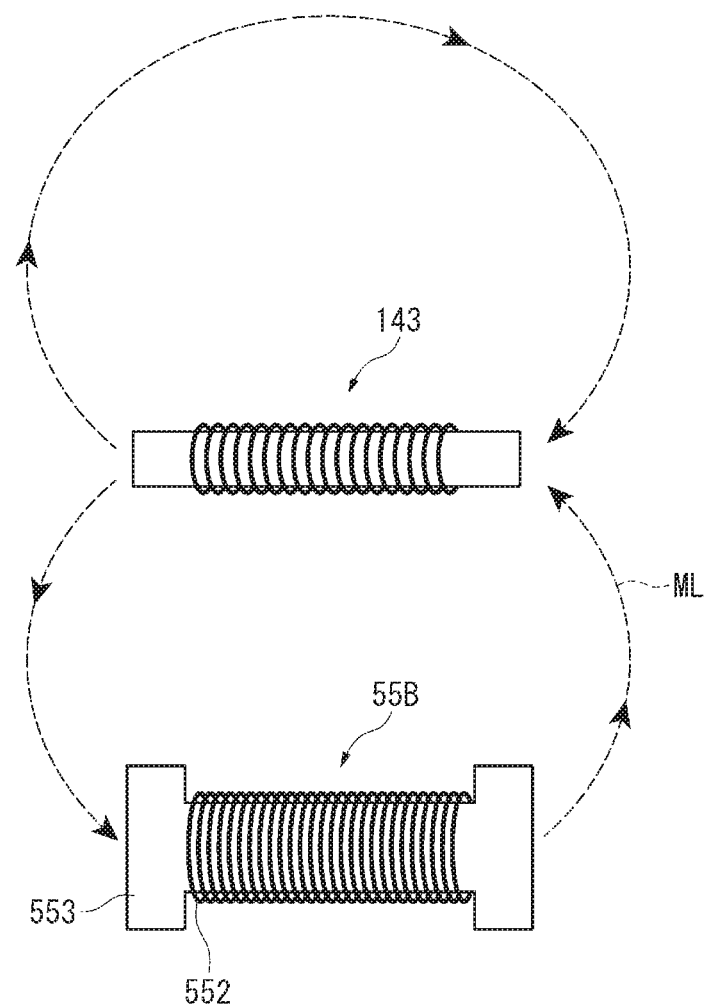
FIG. 30 shows an electronic timepiece and a communication device in a communication system according to another embodiment.

FIG. 30 illustrates the magnetic field when the electronic timepiece 1 is set on the communication device 2B.

As shown in FIG. 30, when a pulse is output by the motor coil 143 of the electronic timepiece 1, magnetic force is produced and magnetic lines of force ML pass through the inside of the coil 55B of the communication device 2B. As a result, induced current flows through the copper wire 552 and a pulse is generated.

Light emitted from the light-emitting device 56A, 56B in in the communication device 2A, 2B can pass through the crystal 33 and be incident to the solar cell 135 of the electronic timepiece 1.

Because the coil 55A, 55B and light-emitting device 56A, 56B are disposed to the stand 58, the communication device 2A, 2B can be configured more compactly than when the coil 55A, 55B is disposed to the stand 58 and the light-emitting device 56A, 56B is disposed to an arm extending from the stand 58.

In each of the foregoing embodiments, the electronic timepiece outputs a pulse to the motor coil to transmit signals, and detects the output voltage of the solar cell to receive signals, but the invention is not so limited.

Figure 31:
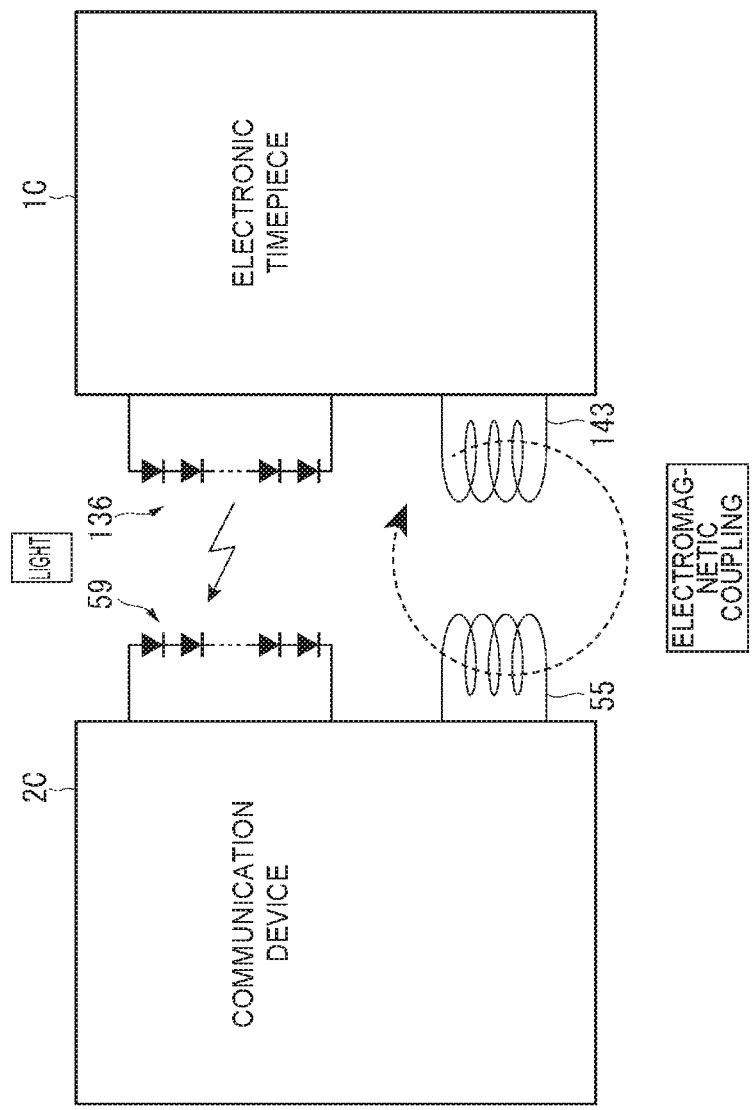
FIG. 31 schematically describes the operation of the communication system according to the another embodiment.

For example, as shown in FIG. 31, a light-emitting device 136 may be disposed to the electronic timepiece 1C, signals transmitted by the electronic timepiece 1C turning the light-emitting device 136 on and off, and signals received by detecting the pulse produced in the motor coil.

In this configuration, the communication device 2C has a photodetector 59, receives signals by detecting the output voltage of the photodetector 59, and transmits signals by outputting a pulse to the coil.

Figure 32:
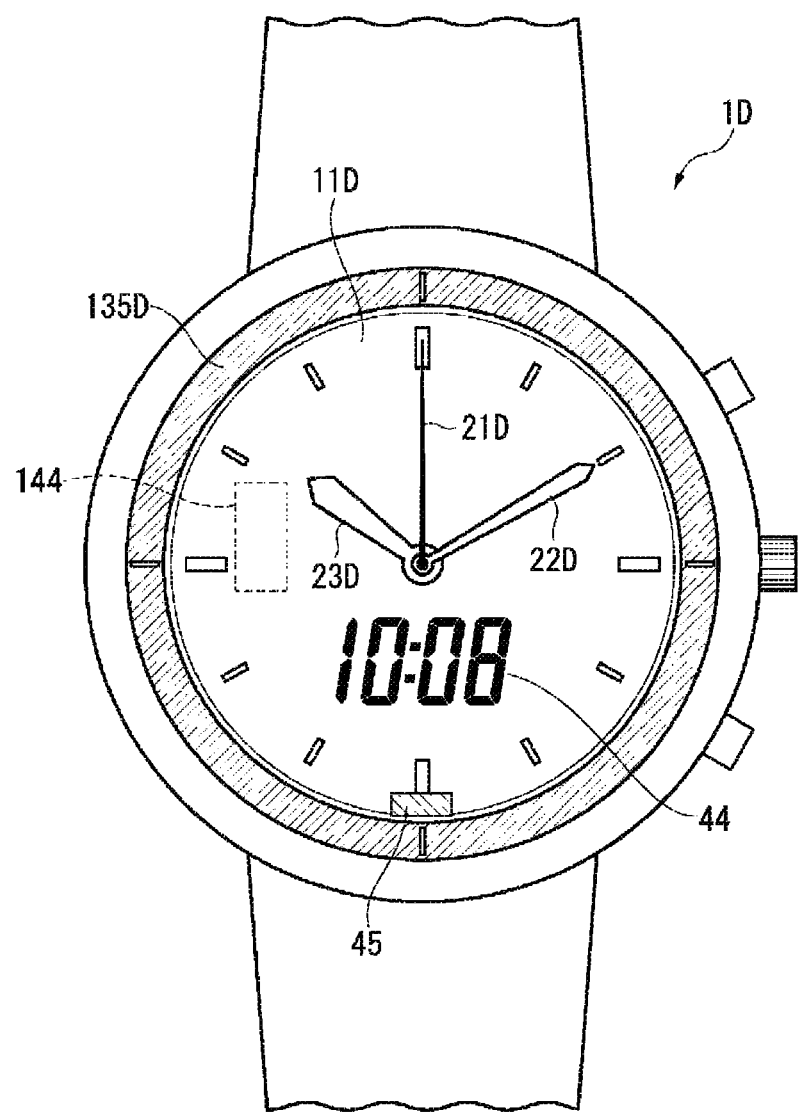
FIG. 32 is a front view of the electronic timepiece in another variation.

FIG. 32 shows the face of an electronic timepiece 1D with a light-emitting device.

In addition to hands 21D (second hand), 22D (minute hand), 23D (hour hand), this electronic timepiece 1D has a display device 44 capable of digitally displaying the time. The display device 44 may be an LCD device or EPD (electrophoretic display).

An LED 45 for illumination is also disposed near the display device 44.

The electronic timepiece 1D also has a buzzer for sounding an alarm, for example, and produces sound by driving a buzzer coil 144 (step-up coil) to make a ceramic device disposed to the back cover oscillate.

The electronic timepiece 1D also has a ring-shaped solar cell module 135D disposed around the outside of the dial 11D. This solar cell module 135D is a module comprising four solar cells.

The electronic timepiece 1D transmits signals by controlling the backlight of the LCD device or the LED 45, which are light-emitting devices, to turn on or off, and receives signals by detecting the pulse produced in the buzzer coil 144.

The electronic timepiece 1D can also transmit signals by outputting pulses (transmission pulses) to the buzzer coil 144, and can receive signals by detecting the output voltage of the solar cell module 135D.

Because the timepiece-side transmitter or timepiece-side receiver can be configured using the buzzer coil 144, there is no need to separately provide a coil for transmitting or a coil for receiving, and an increase in the parts count can be suppressed.

Note that because the transmission pulse has less energy than the pulse for sounding the buzzer, the pulse width and voltage of the transmission pulse are lower than the pulse width and voltage of the pulse that drives the buzzer. As a result, sound is not produced when the transmission pulse is output to the buzzer coil 144. Note that even if the pulse width and voltage of the transmission pulse are the same as the pulse width and voltage of the pulse for sounding the buzzer, the buzzer can be made inaudible to the human ear by outputting a low frequency transmission pulse of 20 Hz or less to the buzzer coil 144.

Note that the electronic timepiece 1D may alternatively be configured to display images of hands with an LCD device, EPD device, or other type of display device 44 instead of using physical hands 21D, 22D, 23D. In this event the electronic timepiece 1D may be configured without a stepper motor, and the timepiece-side transmitter or timepiece-side receiver can be configured using the buzzer coil 144.

A motor coil is used as the coil for transmitting signals in the electronic timepieces of the foregoing embodiments, but the invention is not so limited. For example, the buzzer coil described above, or a coil for driving an EL (electroluminescent) light used for illumination, may be used. Further alternatively, if the electronic timepiece is configured as a radio-controlled timepiece with an antenna for receiving long-wave standard time signals, the antenna coil may be used as the coil for transmitting signals.

The data signal transmission controller 642 of the communication device 2 in the foregoing embodiments transmits update data one bit at a time to the electronic timepiece 1, but the invention is not so limited. For example, the update data may be transmitted two bits at a time. In this case, the data transmission speed is greater than when transmitting one bit at a time.

The data signal transmission controller 642 in the foregoing embodiments reads update data stored in the update data storage 622, but the invention is not so limited. For example, the data signal transmission controller 642 may be configured to control the storage media reader 65 to read the update data stored in the storage, or control the communication interface 63 to read update data stored on a personal computer or electronic device, or update data accessible over a network.

The data signal transmission controller 642 of the communication device 2 in the foregoing embodiments controls the light-emitting device drive circuit 66 of the device-side transmitter 69 and transmits a 1 signal or a 0 signal by turning the light-emitting device 56 on or off, but the invention is not so limited. For example, 1 signals and 0 signals may be transmitted by adjusting the intensity (brightness) of the light-emitting device.

The timepiece-side receiver 170 in the foregoing embodiments has a solar cell 135 as the photoreceptor, but the invention is not so limited. More specifically, a photoreceptor other than a solar cell, such as a photoreceptor for detecting light, may be used.

The timepiece-side receiver 170 in the foregoing embodiments receives signals by detecting the output voltage of the solar cell 135, but the invention is not so limited. For example, signals may be received by detecting the output current of the solar cell 135.

The device-side receiver 68 receives signals by detecting the voltage of the coil 55, but the invention is not so limited. For example, signals may be received by detecting the current of the coil 55.

While operating, the timepiece-side communication processor 340 in the first and second embodiments may also limits operation of the timekeeping reception controller 310 and the positioning reception controller 320. This prevents the satellite signal reception process from running during the communication process, and prevents the communication process from being affected by the satellite signal reception process.

Data is sent from the communication device 2 to the electronic timepiece 1 in the foregoing embodiments, but the invention is not so limited. For example, data may be sent from the communication device 2 to the movement before the movement is installed inside the case during the electronic timepiece 1 manufacturing process.

Because there is no need to provide a terminal for writing data to the movement and write data by connecting a dedicated tool to the terminal in this configuration, there is no need to position the tool to the terminal, writing data is simplified, and the manufacturing process can be simplified.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2015-081096, filed Apr. 10, 2016 is expressly incorporated by reference herein.

What is claimed is:

1. A communication system comprising an electronic timepiece and a communication device, wherein:
    the electronic timepiece includes
        a crystal,
        a light transparent dial,
        a plurality of hands disposed between the crystal and the dial,
        a drive mechanism driving the plurality of hands,
        a solar cell disposed on a side of the dial opposite the crystal, and
        a controller disposed within a case in the electronic timepiece;
    the electronic timepiece has a first communicator;
    the communication device has a second communicator capable of communicating with the first communicator;
    the first communicator has
        a first transmitter including a transmission coil and a drive circuit configured to drive the transmission coil, and is configured to transmit data request signals by communicating through electromagnetic coupling using the transmission coil, the transmission coil being disposed within the drive mechanism and the drive circuit being disposed within the controller, and
        a first receiver including a photodetector and a detection circuit that detects an output value of the photodetector, and configured to receive data signals by optical communication using the photodetector, the photodetector being the solar cell and the detection circuit being disposed within the controller; and
    the second communicator has
        a second transmitter including a light-emitting device and a drive circuit that drives the light-emitting device, and configured to transmit data request signals by optical communication using the light-emitting device to the photodetector, and
        a second receiver including a reception coil and a detection circuit that detects the output value of the reception coil, and configured to receive the data request signals by communicating through electromagnetic coupling using the reception coil,
    wherein, when the second communicator is configured to synchronize with the first communicator, the second communicator sends the data signal in response to each data request signal sent by the first communicator.

2. The communication system described in claim 1, further comprising:
    a stand on which the electronic timepiece is placed,
    wherein the reception coil is disposed on a back cover side of the electronic timepiece placed on the stand, and
    the light-emitting device is disposed on a crystal side of the electronic timepiece placed on the stand.

3. The communication system described in claim 1, further comprising:
    a stand on which the electronic timepiece is placed,
    wherein the reception coil and the light-emitting device are disposed on a crystal side of the electronic timepiece placed on the stand.

4. The communication system described in claim 1, wherein the electronic timepiece communicates with the communication device using a combination of electromagnetic coupling using the transmission coil and optical communication using the photodetector.

5. The communication system described in claim 1, wherein the first communicator and the second communicator exchange data for time correction of the electronic timepiece.

6. An electronic timepiece comprising:
    a crystal,
    a light transparent dial,
    a plurality of hands disposed between the crystal and the dial,
    a drive mechanism driving the plurality of hands,
    a solar cell disposed on a side of the dial opposite the crystal, and
    a controller disposed within a case in the electronic timepiece;
    a first transmitter including a transmission coil and a drive circuit configured to drive the transmission coil, and is configured to transmit data request signals by communicating through electromagnetic coupling using the transmission coil, the transmission coil being disposed within the drive mechanism and the drive circuit being disposed within the controller; and
    a first receiver including a photodetector and a detection circuit that detects an output value of the photodetector, and configured to receive data signals by optical communication using the photodetector, the photodetector being the solar cell and the detection circuit being disposed within the controller,
    wherein, when the electric timepiece is configured to synchronize with a communication device, the electronic timepiece receives the data signal sent from the communication device in response to each data request signal sent by the electronic timepiece.

7. The electronic timepiece described in claim 6, wherein: the solar cell is configured to receive light and generate power.

8. The electronic timepiece described in claim 6, further comprising:
a motor configured to drive a driven member,
wherein the transmission coil is configured by a motor coil of the motor.

9. The electronic timepiece described in claim 6, further comprising:
an alarm buzzer;
wherein the transmission coil is configured by a buzzer coil disposed to the buzzer.

10. The electronic timepiece described in claim 6, further comprising:
a timepiece-side communication processor configured to control the first transmitter and the first receiver and execute a communication process,
the timepiece-side communication processor limiting output of pulses other than pulses for transmitting signals to the transmission coil while executing the communication process.

11. The electronic timepiece described in claim 6, further comprising:
a timepiece-side transmission controller configured to control the first transmitter and execute a transmission process that sends a data request signal to a communication device to acquire the data signal from the communication device; and
a timepiece-side reception controller configured to control the first receiver and execute a reception process to receive the data signal transmitted from the communication device.

12. The electronic timepiece described in claim 6, further comprising:
nonvolatile memory that stores signals,
wherein signals received by the first receiver are stored in the nonvolatile memory.

13. The electronic timepiece described in claim 6, wherein:
a signal of a parameter for controlling operation of the electronic timepiece is included in the signals received by the first receiver.

14. The electronic timepiece described in claim 6, wherein:
a signal of a program for controlling operation of the electronic timepiece is included in the signals received by the first receiver.

15. The electronic timepiece described in claim 6, wherein:
a signal of time zone information or information related to daylight saving time is included in the signals received by the first receiver.

16. The electronic timepiece described in claim 6, wherein the first transmitter and the first receiver are configured to operate simultaneously.

17. The electronic timepiece described in claim 6, wherein the electromagnetic coupling using the transmission coil or the optical communication using the photodetector is used for time correction.

* * * * *